US008567196B2

(12) United States Patent
Okita et al.

(10) Patent No.: US 8,567,196 B2
(45) Date of Patent: Oct. 29, 2013

(54) STEAM TURBINE POWER PLANT AND OPERATING METHOD THEREOF

(75) Inventors: Nobuo Okita, Yokohama (JP); Takeo Suga, Yokohama (JP); Haruhiko Hirata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 466 days.

(21) Appl. No.: 12/862,662

(22) Filed: Aug. 24, 2010

(65) Prior Publication Data

US 2011/0048011 A1 Mar. 3, 2011

(30) Foreign Application Priority Data

Aug. 28, 2009 (JP) ................................. 2009-198370

(51) Int. Cl.
*F01K 7/34* (2006.01)

(52) U.S. Cl.
USPC ................. 60/678; 60/641.8; 60/648; 60/653

(58) Field of Classification Search
USPC ........ 60/649, 653, 646, 657, 676–680, 641.8, 60/641.15, 641.11; 423/220, 229, 232; 95/183
See application file for complete search history.

(56) References Cited

U.S. PATENT DOCUMENTS

| 5,853,680 | A | * | 12/1998 | Iijima et al. | .................. | 423/220 |
| 6,883,327 | B2 | | 4/2005 | Iijima et al. | | |
| 7,607,304 | B2 | * | 10/2009 | Kjaer | .............................. | 60/653 |
| 2004/0221578 | A1 | | 11/2004 | Iijima et al. | | |
| 2008/0216822 | A1 | * | 9/2008 | Lazzara et al. | ................ | 126/617 |
| 2009/0320828 | A1 | | 12/2009 | Koketsu et al. | | |
| 2010/0175365 | A1 | | 7/2010 | Ota | | |

FOREIGN PATENT DOCUMENTS

| JP | 2809381 | B2 | 7/1998 |
| JP | 2004-323339 | A | 11/2004 |
| JP | 2008-039367 | A | 2/2008 |
| JP | 2008-121483 | A | 5/2008 |

* cited by examiner

*Primary Examiner* — Thomas Denion
*Assistant Examiner* — Kelsey Gambrel
(74) *Attorney, Agent, or Firm* — Foley & Lardner LLP

(57) ABSTRACT

A steam turbine power plant 10 includes a steam turbine facility 20 in which power is generated by driving steam turbines with steam from a boiler 21 generating steam using combustion heat and steam from a heat collecting steam generator 31 generating steam using sunlight, and a carbon dioxide collecting facility 60 in which carbon dioxide contained in combustion gas from the boiler 21 and the like is collected. Further, steam from the heat collecting steam generator 31 is delivered to a solar heat steam turbine 32 and performs expansion work, and thereafter part of the steam is delivered to the carbon dioxide collecting facility 60 via a pipe 51 and heats the absorbing liquid 100 in the recovery tower 80.

10 Claims, 9 Drawing Sheets

STEAM TURBINE POWER PLANT AND OPERATING METHOD THEREOF

CROSS REFERENCE TO RELATED APPLICATIONS

This application is based upon and claims the benefit of priority from the prior Japanese Patent Application No. 2009-198370, filed on Aug. 28, 2009; the entire contents of which are incorporated herein by reference.

FIELD

Embodiments described herein relate generally to a steam turbine power plant including a steam turbine, a boiler, a turbine generator, and so on, and to an operating method thereof. The embodiments further relate to a steam turbine power plant in which power generating efficiency is improved by increasing a temperature of steam, and which has an apparatus separating and collecting $CO_2$ contained in combustion gas exhausted from a boiler, and to an operating method thereof.

BACKGROUND

In conventional steam turbine power plants, a temperature condition of steam is 600° C. or lower, and thus members of component parts to be exposed to high-temperature steam, for example turbine rotors, rotor blades, nozzles, and so on, are formed of ferritic heat resistant steels which excel in manufacturability and economical efficiency. On the other hand, carbon steels are employed as materials forming component parts not to be exposed to high-temperature steam, for example feed water heaters.

In late years, efficiencies of steam turbine power plants have been improved proactively for the reasons such as fuel saving and environmental preservation. For example, a steam turbine utilizing high-temperature steam at a temperature of about 600° C. (620° C. or lower) is in service. In such a steam turbine utilizing high-temperature steam, there exist quite a few parts that have characteristic requirements which the ferritic heat resistant steels are unable to satisfy. Accordingly, austenitic heat resistant steels or the like having more excellent high-temperature characteristics are used. However, using the austenitic heat resistant steels leads to increase in facility costs. Moreover, the austenitic heat resistant steels have low heat conductivity and a large linear expansion coefficient as compared to the ferritic heat resistant steels, and thus have a problem that heat stress occurs easily when a load changes during starting of a plant, stopping of a plant, or the like.

Further, what are called 700° C. class advanced ultra-supercritical (A-USC) power generating systems employing steam temperatures of 700° C. or higher are currently studied. When an entrance steam temperature of a steam turbine is 650° C. or higher, there occurs a part where the temperature of turbine extraction steam exceeds 580° C., which makes it necessary to use the heat resistant steels for a feed water heater performing heating with this extraction steam. However, delivering the turbine extraction steam at a temperature higher than 580° C. to the feed water heater is not favorable in view of heat stress, which is generated in proportion to the difference between a feed water temperature and an extraction steam temperature. For avoiding this, there is considered a cycle in which part of steam exhausted from a high-pressure turbine is supplied once to a back pressure extraction turbine to extract work, and extraction steam from the back pressure extraction turbine having decreased pressure and temperature is supplied to the feed water heater. Conventionally, this back pressure extraction turbine is connected directly to a feed water pump for driving the feed water pump.

As one cause of the global warming phenomenon, the greenhouse effect caused by carbon dioxide ($CO_2$) has been pointed out. Accordingly, for example, methods for removing and collecting carbon dioxide in combustion exhaust gas by bringing the combustion exhaust gas into contact with absorbing liquid are studied actively, targeting at thermal power plants using a large amount of fossil fuel.

FIG. 9 is a diagram illustrating an example of a conventional carbon dioxide collecting system 300 which removes and collects carbon dioxide in combustion exhaust gas.

In the conventional carbon dioxide collecting system 300 illustrated in FIG. 9, for example, combustion exhaust gas exhausted by burning fossil fuel in a boiler is led to an absorbing tower 310 via a combustion exhaust gas supply port 311. Absorbing liquid 320 which absorbs carbon dioxide is supplied to an upper part of the absorbing tower 310, and this supplied absorbing liquid 320 is brought into gas-liquid contact with the delivered combustion exhaust gas and absorbs the carbon dioxide in the combustion exhaust gas.

The absorbing liquid 320 which absorbed the carbon dioxide is made to pass through a heat exchanger 340 from a lower part of the absorbing tower 310 by an absorbing liquid circulating pump 330, and is led to a recovery tower 350. In addition, the temperature of the absorbing liquid 320 which absorbed the carbon dioxide becomes higher than the temperature of the absorbing liquid 320 before absorbing the carbon dioxide due to thermal reaction heat by this absorption and sensible heat of the combustion exhaust gas.

On the other hand, the rest of the combustion exhaust gas from which the carbon dioxide is absorbed into the absorbing liquid 320 is emitted to the atmosphere from the upper part of the absorbing tower 310.

The absorbing liquid 320 led to the recovery tower 350 is heated in a reboiler 360 to discharge the absorbed carbon dioxide, and is recovered to be the absorbing liquid 320 capable of absorbing carbon dioxide again. The recovered absorbing liquid 320 is returned to the upper part of the absorbing tower 310 via the heat exchanger 340 by an absorbing liquid circulating pump 331.

On the other hand, the carbon dioxide discharged from the absorbing liquid 320 is led to a steam separator 370 via a cooler 341 to remove water therefrom, and is thereafter led to a carbon dioxide compressor 380 to be collected therein. Condensate separated in the steam separator 370 is led to the recovery tower 350. As the heat source for the reboiler 360, steam extracted from a steam turbine cycle in the thermal power plant or the like is mainly used. However, carbon dioxide gas raised to a high temperature in the process of compressing carbon dioxide can be used as well (see, for example, JP-B2 2809381 (Patent Registration) (hereinafter referred to as Reference 1) and JP-A 2004-323339 (KOKAI) (hereinafter referred to as Reference 2)).

For example, Reference 2 discloses a technique to deliver part of steam exhausted from a high-pressure turbine into a back pressure turbine for driving a carbon dioxide compressor, and deliver part of steam exhausted from an intermediate-pressure turbine into a back pressure turbine for driving auxiliary machines (for example, driving a feed water pump), thereby using steam exhausted from the steam turbines for heating in a carbon dioxide collecting system.

There are disclosed techniques related to a hybrid system which co-uses solar heat in a combined generation system (see, for example, JP-A 2008-39367 (KOKAI) (hereinafter referred to as Reference 3) and JP-A 2008-121483 (KOKAI) (hereinafter referred to as Reference 4)). In this hybrid system co-using solar heat, a heat exchanger absorbing solar heat is provided next to an exhaust heat recovery boiler of a combined generation cycle, thereby improving the fuel consumption of the entire generation cycle.

DETAILED DESCRIPTION

Figure 1:
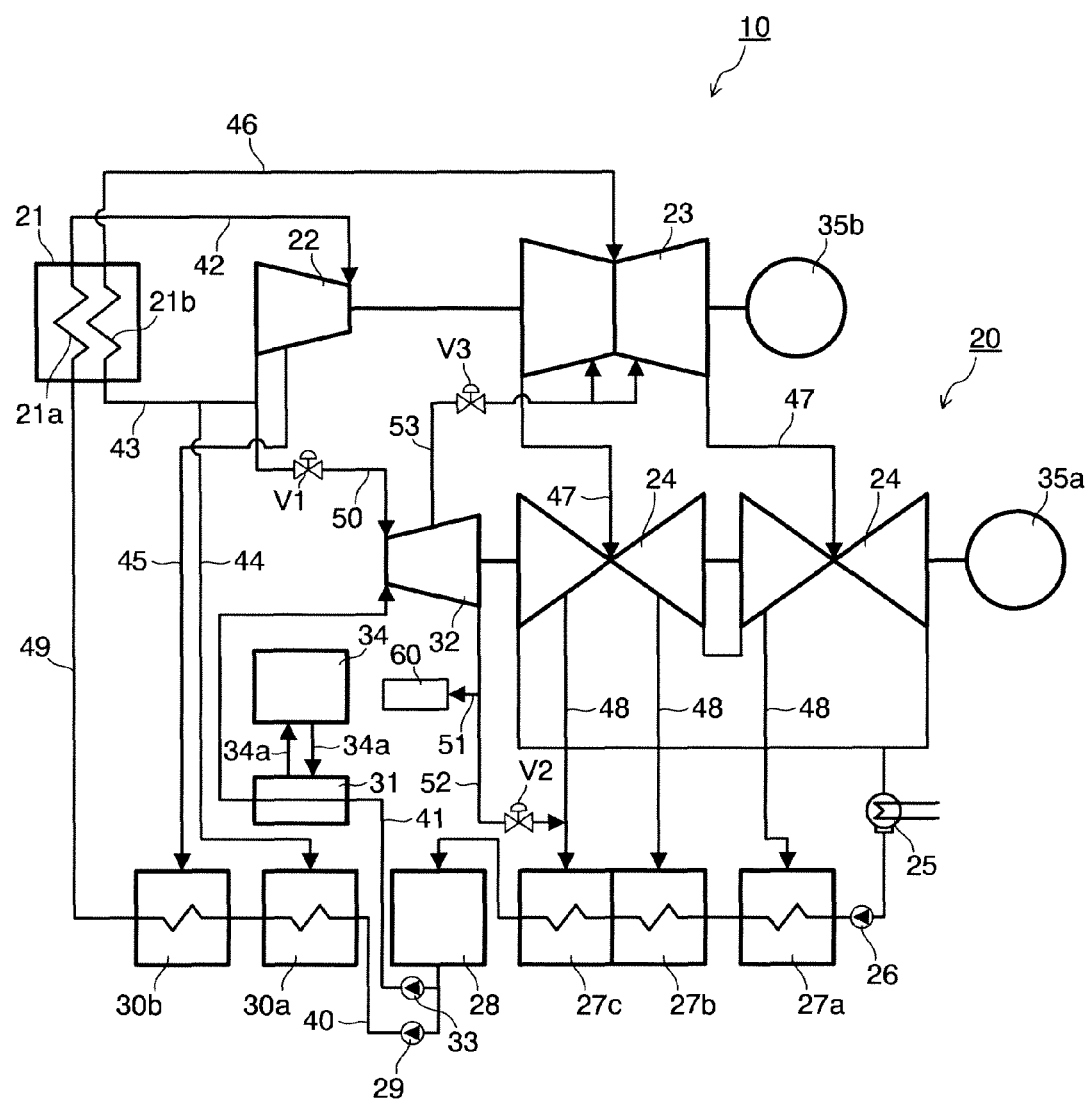
FIG. 1 is a diagram illustrating an overview of a steam turbine power plant of a first embodiment.

In the above-described conventional carbon dioxide collecting system using steam exhausted from the back pressure turbine as heating steam for the absorbing liquid, the sum total of a driving steam flow rate needed by the carbon dioxide compressor and the auxiliary machines does not always correspond to a heating steam flow rate needed in the carbon dioxide collecting system. Thus, when the driving steam flow rate is larger than the necessary steam flow rate, the excess steam is discarded in a steam condenser or the like. In this case, steam with high exergy is exhausted to the condenser, which is a loss of energy. When the drive steam flow rate is lower than the necessary steam flow rate, lacking steam is supplied directly to the carbon dioxide collecting system. In this case, an energy loss is also caused because the supplied steam to the carbon dioxide recovery system shall be reduced in pressure and temperature to the required values, which reduces its exergy.

Further, in the conventional carbon dioxide collecting system, carbon dioxide has to be separated and collected in one way or another from the absorbing liquid which absorbed carbon dioxide in combustion exhaust gas. Normally, this separation of carbon dioxide is most simply performed by heating the absorbing liquid, and thus a heating evaporation method has been employed conventionally. However, to separate carbon dioxide, the heat quantity used for the separation is large, and it is said that the power generating efficiency decreases about 30% by relative value when steam in a steam turbine cycle is extracted.

For example, when an amine-based absorbing liquid having high carbon dioxide absorbing performance is used as the absorbing liquid, the temperature for heating the absorbing liquid which absorbed carbon dioxide to separate the carbon dioxide is about 100° C. to 150° C. The heat quantity needed at this time is said to be 2.5 MJ to 3.5 MJ/(kg-$CO_2$), that is, 2.5 MJ to 3.5 MJ per 1 kg of carbon dioxide. This heat quantity is equivalent to about 10% to 20% of the heating value of coal, for example, when coal is used as fuel for the boiler.

Accordingly, in embodiments which will be described below, a steam turbine power plant and an operating method thereof are provided, which use exhaust steam with low exergy resulting from power generation by a steam turbine utilizing solar heat as an energy source needed in the carbon dioxide collecting system, so as to suppress losses of energy and achieve high power generating efficiency.

According to an embodiment, there is provided a steam turbine power plant including: a steam turbine facility which includes a boiler having a super heater and at least one reheater, a first steam turbine driven by main steam delivered from the super heater, a second steam turbine driven by steam delivered from the reheater, wherein the reheater reheats steam exhausted from the first steam turbine, a third steam turbine driven by steam which is exhausted from the second steam turbine, a generator coupled with at least the third steam turbine, a steam condenser condensing steam exhausted from the third steam turbine into condensate, a feed water heater provided in a water supply system between the steam condenser and the boiler to heat feed water delivered from the steam condenser, a heat collecting steam generator generating steam from part of the condensate by utilizing heat of sunlight, and a fourth steam turbine driven by steam delivered from at least the heat collecting steam generator; and a carbon dioxide collecting facility which includes an absorbing tower in which carbon dioxide contained in combustion gas from the boiler is absorbed by an absorbing liquid, a recovery tower in which the absorbing liquid is heated, by utilizing heat of steam exhausted from the fourth steam turbine, to discharge the carbon dioxide from the absorbing liquid, and a collecting apparatus collecting carbon dioxide discharged in the recovery tower.

Further, according to an embodiment, there is provided an operating method of a steam turbine power plant, including: generating main steam in a boiler; driving a first steam turbine by the main steam; supplying at least part of exhaust steam from the first steam turbine to the boiler to generate reheated steam; generating the reheated steam in the boiler; driving a second steam turbine by the reheated steam; driving a third steam turbine steam exhausted from the second steam turbine; condensing steam exhausted from the third steam turbine into condensate; heating the condensate by utilizing heat of steam extracted or exhausted from at least one of the first, the second, and the third steam turbines; supplying at least part of the condensate to the boiler to generate the main steam; generating steam from part of the condensate in a heat collecting steam generator by utilizing heat of sunlight; driving a fourth steam turbine by steam generated in at least the heat collecting steam generator; absorbing carbon dioxide contained in combustion gas from the boiler into an absorbing liquid; discharging the carbon dioxide from the absorbing liquid by utilizing heat of steam exhausted from the fourth steam turbine; and collecting carbon dioxide discharged from the recovery tower.

Hereinafter, embodiments will be described with reference to the drawings.

[First Embodiment]

FIG. 1 is a diagram illustrating an overview of a steam turbine power plant 10 of a first embodiment.

The steam turbine power plant 10 of the first embodiment includes a steam turbine facility 20 in which power is generated by driving steam turbines with steam from a boiler 21 generating steam utilizing combustion heat and steam from a heat collecting steam generator 31 generating steam utilizing heat of sunlight, and a carbon dioxide collecting facility 60 in which carbon dioxide contained in combustion gas from the boiler 21 and the like is collected.

First the steam turbine facility 20 will be described.

As illustrated in FIG. 1, the steam turbine facility 20 includes a boiler 21 having a super heater 21a and a reheater 21b, a high-pressure turbine 22 functioning as the first steam turbine, an intermediate-pressure turbine 23 functioning as the second steam turbine, a low-pressure turbine 24 functioning as the third steam turbine, a steam condenser 25, a condensate pump 26, low-pressure feed water heaters 27a, 27b, 27c, a deaerator 28, a boiler feed water pump 29, and high-pressure feed water heaters 30a, 30b.

Further, the steam turbine facility 20 includes a heat collecting steam generator 31 heating part of feed water deaerated in the deaerator 28 by thermal energy of sunlight to generate steam, and a solar heat steam turbine 32 functioning as the fourth steam turbine to which steam generated in this heat collecting steam generator 31 is delivered. Further, it is structured such that part of steam exhausted from the solar heat steam turbine 32 is supplied to the carbon dioxide collecting facility 60.

The heat collecting steam generator 31 includes, for example, a heating mechanism heating a liquid heat medium by sunlight, a heat exchanger heating feed water by the heat medium supplied from this heating mechanism, a circulating pump provided on a pipe which circulates the heat medium to the heating mechanism and the heat exchanger, and so on. Specifically, for the heat collecting steam generator 31, for example, it is possible to use a trough-type solar thermal collector having a curved mirror which concentrates sunlight linearly or a tower-type solar thermal collector using flat mirrors which concentrate sunlight to a heat collector located at a center part. In these solar thermal collectors, a heat medium such as oil is heated by solar heat energy, and heat from this heat medium is given to the water supply by heat exchange. In the trough-type solar thermal collector, for example, steam at a temperature within the range of 370° C. to 400° C. is obtained. On the other hand, in the tower-type solar thermal collector, for example, steam at a temperature within the range of 500° C. to 550° C. is obtained. Accordingly, when choosing a solar thermal collector, it is preferred to choose a solar thermal collector by which steam at a temperature close to that of exhausted steam from the high-pressure turbine 22 can be obtained.

Here, a heat accumulator 34 accumulating part of heat of steam generated in the heat collecting steam generator 31 may be provided between the heat collecting steam generator 31 and the solar heat steam turbine 32. In addition, for accumulating heat in the heat accumulator 34, any method may be used, such as one utilizing sensible heat of a substance, one utilizing latent heat of a substance, one utilizing chemical reaction, or the like.

When the heat accumulator 34 is included, a circulation pipe 34a circulating the heat medium of the heat collecting steam generator 31 is provided between the heat collecting steam generator 31 and the heat accumulator 34. When heat is accumulated in the heat accumulator 34, or when the heat accumulated in the heat accumulator 34 is used in the heat collecting steam generator 31, a circulating pump (not illustrated) provided on the circulation pipe 34a is actuated to accumulate heat or to discharge the accumulated heat. By thus including the heat accumulator 34, it is possible to accumulate excessive heat once in the heat accumulator 34 for example when the amount of insolation is large. On the other hand, when a predetermined solar heat energy amount cannot be obtained at night or due to a small amount of insolation, the accumulated heat can be taken out. That is, by including the heat accumulator 34, a variation of solar heat can be absorbed and equalized.

Here, the solar heat steam turbine 32 is connected along the same axis as the low-pressure turbine 24 and is structured to drive a generator 35a. The high-pressure turbine 22 is connected along the same axis as the intermediate-pressure turbine 23 and is structured to drive a generator 35b. By thus disposing the steam turbines, it is possible to suppress the entire length from becoming long, and thereby reduce steam leakage due to a difference in thermal expansion between turbine rotors and stationary members. Moreover, by separately having the steam turbine to which high-temperature steam is delivered and the steam turbine to which relatively low-temperature steam is delivered, and disposing a thrust bearing in each of them appropriately, start-up characteristics can be improved.

In this steam turbine facility 20, high-temperature steam generated in the super heater 21a of the boiler 21 is delivered to the high-pressure turbine 22 via a main steam pipe 42, performs expansion work, and is delivered thereafter to the reheater 21b of the boiler 21 via a low-temperature reheat steam pipe 43. Here, the temperature of the steam delivered from the super heater 21a to the high-pressure turbine 22 is preferred to be 620° C. or higher in view of improving power generating efficiency. For example, it is also possible to deliver high-temperature steam at a temperature of about 650° C. or higher to the high-pressure turbine 22. Part of steam exhausted from the high-pressure turbine 22 is delivered to the high-pressure feed water heater 30a via a pipe 44 branched from the low-temperature reheat steam pipe 43, which delivers the steam exhausted from the high-pressure turbine 22 to the reheater 21b, so as to heat the feed water. Further, extraction steam extracted from the high-pressure turbine 22 is delivered to the high-pressure feed water heater 30b via a pipe 45 so as to heat the feed water.

Here, when the temperature of the steam exhausted from the high-pressure turbine 22 is higher than a predetermined temperature of steam delivered to the high-pressure feed water heater 30a, it is preferred to provide a heat exchanger (not illustrated) capable of exchanging heat between feed water that flows in a feed water pipe 49 between the high-pressure feed water heater 30a and the super heater 21a of the boiler 21 and steam that flows in the pipe 44 delivering the steam exhausted from the high-pressure turbine 22 to the high-pressure feed water heater 30a. In this case, this heat exchanger may be structured as a desuperheater which gives part of sensible heat of the steam exhausted from the high-pressure turbine 22 to the feed water. Thus, steam at an appropriate temperature can be delivered to the high-pressure feed water heater 30a.

The steam heated again (reheated) to be superheated steam (reheated steam) at a high temperature in the reheater 21b is delivered to the intermediate-pressure turbine 23 via a high-temperature reheat steam pipe 46, performs expansion work, and is delivered thereafter to the low-pressure turbine 24 via a pipe 47. Here, it is preferred that the temperature of the steam heated in the reheater 21b and delivered to the intermediate-pressure turbine 23 be 620° C. or higher in view of improving power generating efficiency. For example, high-temperature steam at about 650° C. or higher can be delivered to the intermediate-pressure turbine 23. The intermediate-pressure turbine 23 drives the generator 35b to generate power.

The steam delivered to the low-pressure turbine 24 and performed expansion work is led to the steam condenser 25 to be condensed into condensate. Extraction steam extracted from the low-pressure turbine 24 is led to the low-pressure feed water heaters 27a, 27b, 27c via a pipe 48 to heat the feed water. The low-pressure turbine 24 drives the generator 35a to generate power.

The condensate in the steam condenser 25 is delivered to the low-pressure feed water heaters 27a, 27b, 27c and the deaerator 28 by the condensate pump 26 and reused as feed water to the boiler 21. The condensate delivered to the deaerator 28 is pressurized by the boiler feed water pump 29 and is supplied via the feed water pipe 49 to the super heater 21a through the high-pressure feed water heaters 30a, 30b. On the other hand, part of the feed water (condensate) delivered to the deaerator 28 is delivered to the heat collecting steam generator 31 by a feed water pump 33 via a pipe 41 branched from a water supply system pipe 40. The feed water delivered to the heat collecting steam generator 31 is heated in the heat collecting steam generator 31 and turns to steam, and is delivered to the solar heat steam turbine 32.

For example, when the heat accumulator 34 is included, if the solar heat energy obtained by the heat collecting steam generator 31 surpasses a necessary amount, the circulating pump (not illustrated) provided on the circulation pipe 34a is actuated to accumulate heat in the heat accumulator 34. A predetermined amount of solar heat energy is then given to the feed water via a heat medium from the heat collecting steam generator 31, thereby enabling to deliver steam at an appropriate temperature to the solar heat steam turbine 32.

On the other hand, when the heat accumulator 34 is included and the heat accumulator 34 has already accumulated heat, if the solar heat energy obtained by the heat collecting steam generator 31 is lower than a necessary amount, the circulating pump (not illustrated) provided on the circulation pipe 34a is actuated to use in the heat collecting steam generator 31 the heat accumulated in the heat accumulator 34. A predetermined amount of solar heat energy is then given to the feed water via a heat medium from the heat collecting steam generator 31, thereby enabling to deliver steam at an appropriate temperature to the solar heat steam turbine 32.

Here, there may be provided a pipe 50 branched from the low-temperature reheat steam pipe 43, which delivers the steam exhausted from the high-pressure turbine 22 to the reheater 21b, and communicating with a steam inlet of the solar heat steam turbine 32. For example, when the heat accumulator 34 is not included, or when the heat accumulator 34 is included but the energy given to the feed water is not sufficient by only the heat accumulated in the heat accumulator 34, part of the steam exhausted from the high-pressure turbine 22 can be delivered to the solar heat steam turbine 32 via the pipe 50. Here, it is preferred that the steam delivered to the solar heat steam turbine 32 be at a temperature close to that of the steam generated by the heat collecting steam generator 31. For example, the steam may be at a temperature within the range of 370° C. to 400° C. when the heat collecting steam generator 31 is the trough type, and may be at a temperature within the range of 500° C. to 550° C. when the heat collecting steam generator 31 is the tower type.

The steam delivered to the solar heat steam turbine 32 performs expansion work, and thereafter part thereof is supplied to the carbon dioxide collecting facility 60 via a pipe 51. The rest is delivered to the low-pressure feed water heater 27c via a pipe 52 branched from the pipe 51 together with the above-described extraction steam extracted from the low-pressure turbine 24.

Here, extraction steam extracted from the solar heat steam turbine 32 may be delivered to a predetermined turbine stage of the intermediate-pressure turbine 23 via a pipe 53 as cooling steam for cooling a turbine rotor, turbine rotor blades, a casing, and so on of the intermediate-pressure turbine 23. Thus, the creep strengths of the turbine rotor and the turbine rotor blades of the intermediate-pressure turbine 23 can be assured. Further, by utilizing the cooling steam at a low temperature extracted from the solar heat steam turbine 32, a cycle loss can be reduced. In addition, when steam from the solar heat steam turbine 32 is extracted to cool the intermediate-pressure turbine 23, it is preferred to extract from the solar heat steam turbine 32 steam at a pressure higher than the pressure of the steam in a cooling part of the intermediate-pressure turbine 23.

Here, the pipe 50 is provided with a flow regulating valve V1 for adjusting the flow rate of the steam delivered to the solar heat steam turbine 32. Also the pipe 52 is provided with a pressure regulating valve V2 for adjusting the pressure of the steam exhausted from the solar heat steam turbine 32. Further, when steam extracted from the solar heat steam turbine 32 is delivered to the intermediate-pressure turbine 23 as cooling steam, the pipe 53 is provided with a flow regulating valve V3 for adjusting the flow rate of extracted steam from the solar heat steam turbine 32. In addition, with respect to the output of generated power in the steam turbine power plant 10, the flow rate of main steam delivered to the high-pressure turbine 22 is adjusted with a steam control valve (not illustrated) so that the total output of the generator 35a and the generator 35b corresponds to a target output. Further, the above-described valves, pumps, and so on are feedback controlled by a not-illustrated control device based on information from, for example, a temperature sensing device, a flow sensing device, a pressure sensing device, and so on, which are not illustrated.

For example, the flow rate and the temperature of steam delivered to the carbon dioxide collecting facility 60 is adjusted to be a predetermined flow rate and a predetermined temperature by the control device controlling the pressure regulating valve V2 and so on. Specifically, when the temperature of the steam exhausted from the solar heat steam turbine 32 is lower than the temperature of steam needed in the carbon dioxide collecting facility 60, for example the pressure regulating valve V2 is closed to increase the pressure of the steam exhausted from the solar heat steam turbine 32. Thus, the temperature of the steam exhausted from the solar heat steam turbine 32 can be increased to be close to the predetermined temperature. In addition, when small adjustment of the temperature is needed, for example, part of the pipe 51 may be cooled by spray water or the like to perform the temperature adjustment. When the flow rate of the steam delivered to the carbon dioxide collecting facility 60 is lower than a predetermined flow rate, for example, the amount of feed water from the feed water pump 33 can be increased or the opening of the flow regulating valve V1 can be increased to make it close to the predetermined flow rate.

Note that although the example of adjusting the flow regulating valve V1 and the pressure regulating valve V2 based on the temperature and the flow rate of the steam delivered to the carbon dioxide collecting facility 60 has been described here, the flow regulating valve V1 and the pressure regulating valve V2 may be adjusted based on, for example, the temperature of the absorbing liquid in the recovery tower of the carbon dioxide collecting facility 60, which will be described later. By thus adjusting the flow regulating valve V1 and the pressure regulating valve V2 based on the temperature of the absorbing liquid, it is possible to reduce a time delay for performing appropriate control. In this situation, the flow regulating valve V1 and the pressure regulating valve V2 may be controlled regarding the flow rate of the absorbing liquid as a function, in order to stabilize the control.

Next, the carbon dioxide collecting facility 60 will be described.

Figure 2:
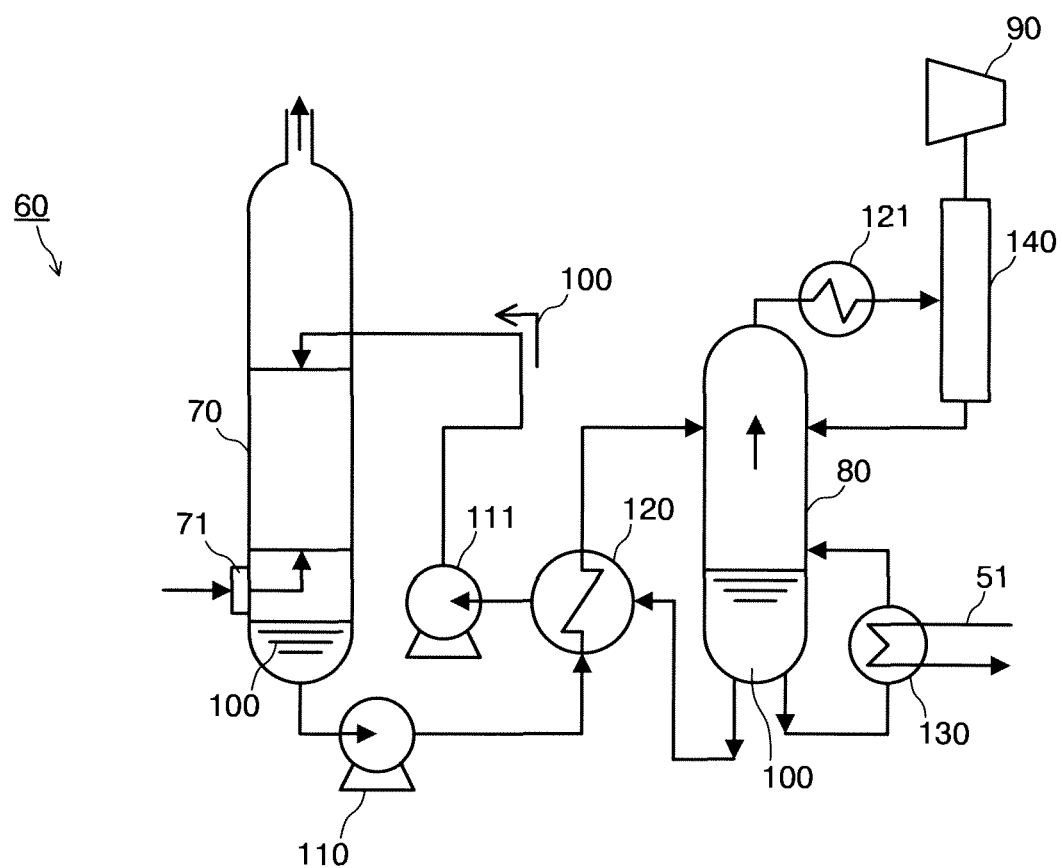
FIG. 2 is a diagram illustrating an overview of a carbon dioxide collecting facility in the steam turbine power plant of the first embodiment.

FIG. 2 is a diagram illustrating an overview of the carbon dioxide collecting facility 60 in the steam turbine power plant 10 of the first embodiment.

As illustrated in FIG. 2, the carbon dioxide collecting facility 60 includes an absorbing tower 70, a recovery tower 80, and a carbon dioxide collecting apparatus 90.

The absorbing tower 70 is a tower to which combustion gas exhausted from the boiler 21 is delivered, and this combustion gas is brought into gas-liquid contact with absorbing liquid 100, so that the carbon dioxide contained in the combustion gas is absorbed into the absorbing liquid 100.

The recovery tower 80 is a tower in which the absorbing liquid 100 which absorbed carbon dioxide in the absorbing tower 70 is heated by utilizing heat of the steam exhausted from the solar heat steam turbine 32, so as to separate the carbon dioxide from the absorbing liquid 100.

The carbon dioxide collecting apparatus 90 is an apparatus for collecting the carbon dioxide separated in the recovery tower 80. The carbon dioxide collecting apparatus 90 is constituted of, for example, a compressing collector which compresses and collects the separated carbon dioxide, or the like.

The absorbing liquid here may be one to which carbon dioxide can be absorbed and from which carbon dioxide can be discharged under a predetermined condition, and for example, an amine aqueous solution or the like can be used. As the amine aqueous solution, specifically it is possible to use, for example, an aqueous solution of one of alkanolamines such as monoethanolamine, diethanolamine, triethanolamine, methyldiethanolamine, diisopropanolamine, and diglycolamine, or an aqueous solution in which two or more of them are mixed.

In the above-described carbon dioxide collecting facility 60, for example, combustion exhaust gas produced by burning and exhausting fossil fuel in the boiler 21 is delivered to the absorbing tower 70 via a combustion exhaust gas supply port 71. The absorbing liquid 100 which absorbs carbon dioxide is supplied to an upper part of the absorbing tower 70, and this supplied absorbing liquid 100 is sprayed downward for example to be brought into gas-liquid contact with the delivered combustion exhaust gas, thereby absorbing carbon dioxide in the combustion exhaust gas.

The absorbing liquid 100 which absorbed carbon dioxide is made to pass through a heat exchanger 120 from a lower part of the absorbing tower 70 by an absorbing liquid circulating pump 110, and is delivered to the recovery tower 80. Here, when passing through the heat exchanger 120, the absorbing liquid 100 is heated by the absorbing liquid 100 delivered from the recovery tower 80 to the absorbing tower 70. The temperature of the absorbing liquid 100 which absorbed carbon dioxide becomes higher, by reaction heat of this absorption and sensible heat of the combustion exhaust gas, than the temperature of the absorbing liquid 100 before absorbing carbon dioxide.

On the other hand, the rest of the combustion exhaust gas from which carbon dioxide is absorbed into the absorbing liquid 100 is released to the atmosphere from the upper part of the absorbing tower 70.

The absorbing liquid 100 delivered to the recovery tower 80 is heated in a reboiler 130 to discharge the absorbed carbon dioxide, and is recovered to be the absorbing liquid 100 capable of absorbing carbon dioxide again. The steam exhausted from the solar heat steam turbine 32 is delivered to the reboiler 130 via the pipe 51. By this steam exhausted from the solar heat steam turbine 32, the absorbing liquid 100 which absorbed carbon dioxide is heated.

Here, the temperature of the steam exhausted from the solar heat steam turbine 32 and delivered to the reboiler 130 is set to a predetermined temperature by the above-described control in the steam turbine facility 20. The predetermined temperature here is a temperature needed for heating the absorbing liquid 100 to a temperature at which carbon dioxide can be discharged effectively in the recovery tower 80, and is set appropriately corresponding to the used absorbing liquid 100. For example, when the above-described amine aqueous solution is used as the absorbing liquid 100, the temperature at which carbon dioxide can be discharged effectively is within the range of 100° C. to 120° C. That is, heat by which the temperature of the absorbing liquid 100 delivered to the recovery tower 80 can be increased to be within the range of 100° C. to 120° C. may be given to the absorbing liquid 100 in the reboiler 130. That is, the predetermined temperature of the steam delivered to the carbon dioxide collecting facility 60 differs depending on the flow rate of the heated absorbing liquid 100 and the flow rate of steam delivered to the reboiler 130, and it is preferred that the predetermined temperature be set within the range of about 130° C. to 150° C. considering these flow rates.

The steam which released heat to the absorbing liquid 100 by the reboiler 130 is delivered to the steam condenser 25 illustrated in FIG. 1 and condensed into condensate. When the steam which released heat to the absorbing liquid 100 by the reboiler 130 is condensed into condensate, the condensate from the reboiler 130 may be led to, for example, the pipe in which condensate flows between the low-pressure feed water heater 27a and the low-pressure feed water heater 27b illustrated in FIG. 1.

Further, the recovered absorbing liquid 100 from which carbon dioxide is discharged is returned again to the upper part of the absorbing tower 70 via the heat exchanger 120 by an absorbing liquid circulating pump 111. Here, when passing through the heat exchanger 120, the absorbing liquid 100 heats the absorbing liquid 100 which is delivered from the absorbing tower 70 to the recovery tower 80. Thus, the temperature of the absorbing liquid 100 returned to the absorbing tower 70 turns to a temperature that is lower than the temperature in the recovery tower 80 and is appropriate for absorbing carbon dioxide of the combustion exhaust gas in the absorbing tower 70. In short, the heat exchanger 120 is a regenerative heat exchanger that recovers heat of the recovered absorbing liquid 100 at a relatively high temperature, which is supplied via the absorbing liquid circulating pump 111 from the reboiler 130, into the absorbing liquid 100 at a relatively low temperature which absorbed carbon dioxide, which is supplied via the absorbing liquid circulating pump 110 from the lower part of the absorbing tower 70 and is needed to be heated for evaporating the absorbed carbon dioxide.

On the other hand, the carbon dioxide discharged from the absorbing liquid 100 in the recovery tower 80 is delivered to a steam separator 140 via a cooler 121 to remove water therefrom, and is thereafter delivered to the carbon dioxide collecting apparatus 90 to be collected therein. Condensate separated in the steam separator 140 is delivered to the recovery tower 80.

In addition, the absorbing liquid circulating pump 110, the absorbing liquid circulating pump 111, the carbon dioxide collecting apparatus 90, and so on are controlled by the above-described control device (not illustrated).

Next, the cycle efficiency in the steam turbine power plant 10 of the first embodiment will be described.

Figure 3:
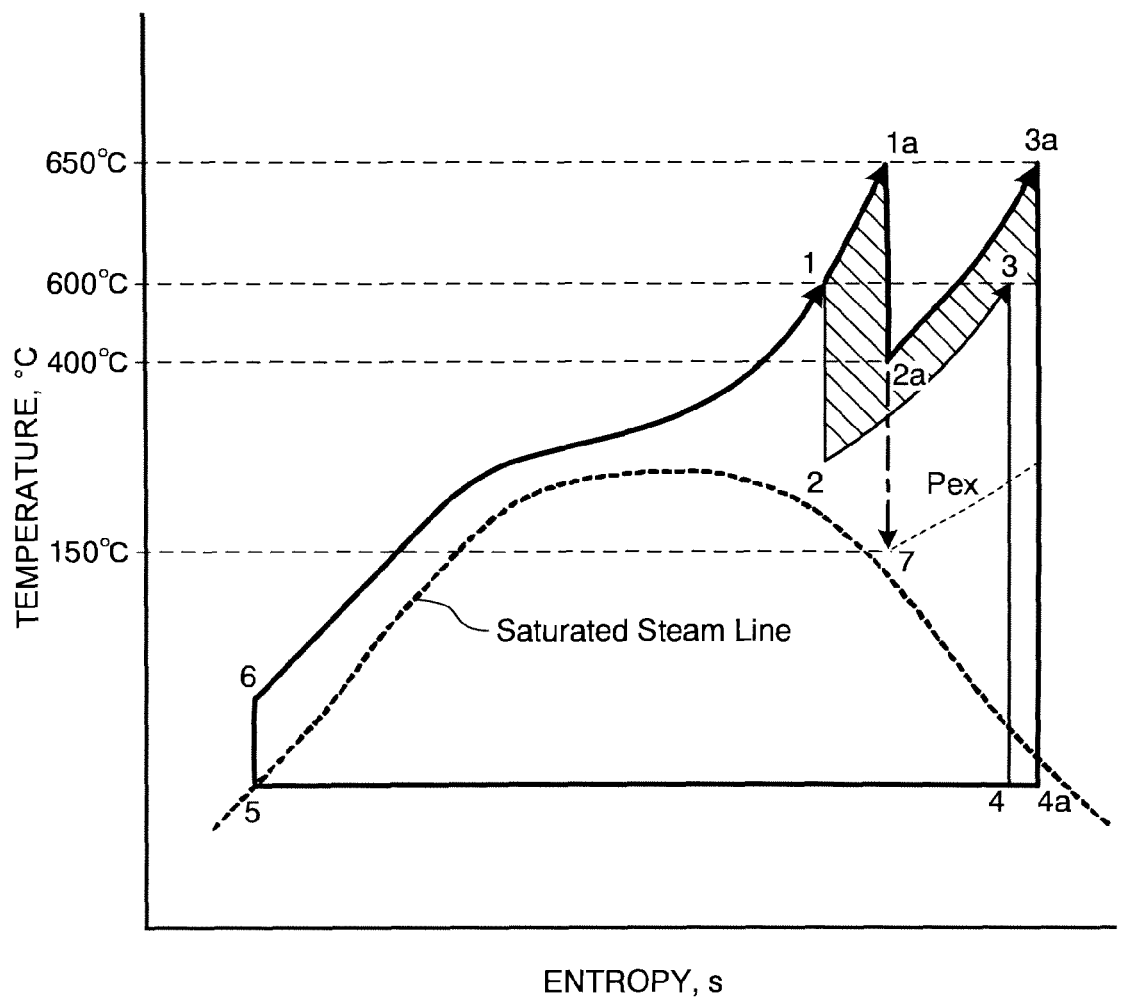
FIG. 3 is a diagram illustrating state changes of steam in the steam turbine power plant of the first embodiment by a T-s line chart (temperature-entropy line chart).

FIG. 3 is a diagram illustrating state changes of steam in the steam turbine power plant 10 of the first embodiment by a T-s line chart (temperature-entropy line chart). Note that FIG. 3 also illustrates state changes in a conventional one-stage reheat cycle for comparison. Here, an example is described in which the temperature of the steam delivered to the high-pressure turbine 22 of the steam turbine power plant 10 of the first embodiment is 650° C., and the temperature of steam delivered to a high-pressure turbine in a conventional steam turbine power plant is 600° C. In addition, in FIG. 3, the expansion process in each steam turbine is assumed to be adiabatic expansion.

In the conventional steam turbine power plant, 6->1 denotes isobaric temperature increase in a super heater, 1->2 denotes adiabatic expansion in the high-pressure turbine, 2->3 denotes isobaric reheating in a reheater, and 3->4 denotes adiabatic expansion in an intermediate-pressure turbine and a low-pressure turbine. Further, 4->5 denotes isobaric condensation in a steam condenser, and 5->6 denotes pressure increase and temperature increase in a feed water pump and a feed water heater.

On the other hand, in the steam turbine power plant 10 of the first embodiment, since the temperature of the steam delivered to the high-pressure turbine 22 is higher than the temperature of steam delivered to the high-pressure turbine in the conventional steam turbine power plant, adiabatic expansion in the high-pressure turbine 22 is 1a->2a. Adiabatic expansion in the intermediate-pressure turbine 23 and the low-pressure turbine 24 is 3a->4a.

In FIG. 3, the area surrounded by steam state values higher than conventional steam state values (area of the portion denoted by oblique lines in FIG. 3) is an energy increment that can be taken out as work, that is, an amount of contribution to efficiency improvement owing to the temperature increase.

Further, adiabatic expansion in the solar heat steam turbine 32 is represented by 2a->7, and the temperature of the steam exhausted from the solar heat steam turbine 32 is determined by the pressure Pex of the exhausted steam. Here, the temperature and pressure of steam generated in the heat collecting steam generator 31 are substantially the same as the temperature and pressure of the steam exhausted from the high-pressure turbine 22, and thus steam delivered from either of them to the solar heat steam turbine 32 is under a steam condition 2a.

Further, for example, when the temperature of the steam exhausted from the solar heat steam turbine 32 is lower than the temperature (for example, 150° C.) of steam needed in the carbon dioxide collecting facility 60, the pressure regulating valve V2 is closed to increase the pressure Pex of the steam exhausted from the solar heat steam turbine 32. Thus, the temperature of the steam exhausted from the solar heat steam turbine 32 can be increased to be close to the predetermined temperature. When the flow rate of the steam delivered to the carbon dioxide collecting facility 60 is lower than a predetermined flow rate, for example, the amount of feed water from the feed water pump 33 can be increased or the opening of the flow regulating valve V1 can be increased, so as to make the flow rate be close to the predetermined flow rate.

By the above-described control, the output of the entire steam turbine power plant 10 is determined by the total output of the generator 35a and the generator 35b. Accordingly, obtaining a predetermined output is possible by controlling the flow rate of the steam delivered to the high-pressure turbine 22 by a steam control valve (not illustrated) and thereby controlling outputs of the generators 35a, 35b.

In addition, when the steam turbine power plant 10 is operated with the steam delivered to the reboiler 130 being cut off for the purpose of replacing the absorbing liquid 100 of the carbon dioxide collecting facility 60, or the like, a shut-off valve (not illustrated) provided on the pipe 51 is closed to shut off the flow of steam into the carbon dioxide collecting facility 60. Moreover, the pressure regulating valve V2 is fully opened to control the whole amount of the steam exhausted from the solar heat steam turbine 32 to be delivered to the low-pressure feed water heater 27c.

Here, there will be described solar heat energy and output of the solar heat steam turbine 32 in the case where the heat accumulator 34 is included in the steam turbine facility 20 of the steam turbine power plant 10 and the case where the heat accumulator 34 is not included.

Figure 4:
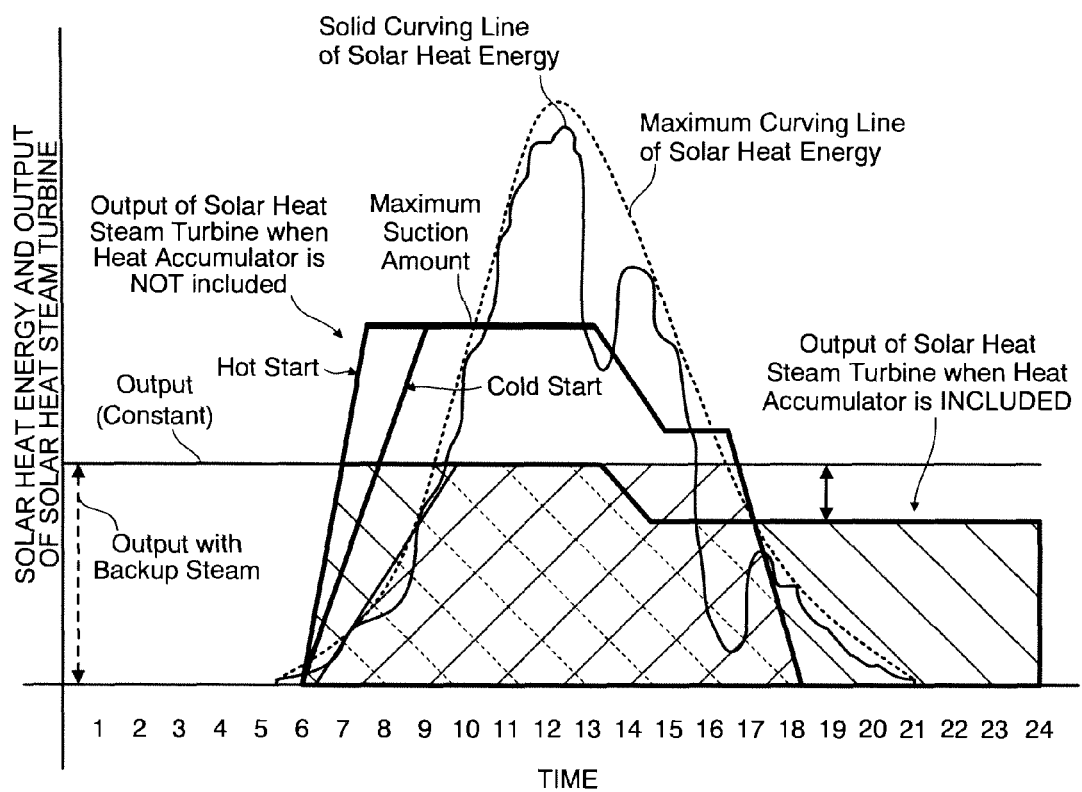
FIG. 4 is a diagram for explaining the relation between solar heat energy and output of a solar heat steam turbine in one day.

FIG. 4 is a diagram for explaining the relation between solar heat energy and output of the solar heat steam turbine 32 in one day. Note that here it is assumed that output of the solar heat steam turbine 32 (displacement of the solar heat steam turbine 32) is constant.

When the heat accumulator 34 is not included, as illustrated in FIG. 4, it is possible to output up to the maximum steam amount which can be sucked into the solar heat steam turbine 32 (maximum suction amount) depending on the solar heat energy. However, even when it is possible to output up to the maximum suction amount of the solar heat steam turbine 32, since the steam amount needed in the carbon dioxide collecting facility 60 is predetermined, excess energy exceeding this necessary amount is lost. Further, when it becomes not possible to obtain the solar heat energy, the energy corresponding to obtaining the above-described constant output (energy corresponding to the portion shown by a dashed arrow in FIG. 4) should be supplemented by the steam exhausted from the high-pressure turbine 22 (backup steam). In addition, in the above-described case where the heat accumulator 34 is not included, a combustion supporting device is provided.

On the other hand, when the heat accumulator 34 is included, a large amount of solar heat energy can be obtained, and excess energy exceeding the steam amount needed in the carbon dioxide collecting facility 60 can be accumulated in the heat accumulator 34. Accordingly, when the solar heat energy decreases, such as in the early evening, the heat accumulated in the heat accumulator 34 can be used to deliver steam to the solar heat steam turbine 32. Thus, the energy that should be supplemented by the backup steam is the energy that is still insufficient when the heat in the heat accumulator 34 is used (energy corresponding to the portion shown by a solid arrow in FIG. 4). When the above-described heat accumulator 34 is included, it is not necessary to have a combustion supporting device.

As described above, the fuel consumption reduction owing to the solar heat steam turbine 32 can increase from the amount of fuel consumption reduction owing to utilizing the solar heat energy when the heat accumulator 34 is not included (the energy amount of the portion shown by oblique lines declining leftward in FIG. 4) to the amount of fuel consumption reduction owing to utilizing the solar heat energy when the heat accumulator 34 is included (the energy amount of the portion shown by oblique lines declining rightward in FIG. 4).

In addition, for example, coal fire is generally inferior to other fuels in boiler operability, and since the performance is improved by the temperature increase, the steam turbine power plant is operated near a rated condition which yields good performance during the day. In the nighttime in which the power demand is low, the steam turbine power plant 10 is often operated without stopping. Particularly in a steam turbine power plant under such operating conditions, it is effective to include the heat accumulator 34.

As described above, in the steam turbine power plant 10 of the first embodiment, the heat collecting steam generator 31 and the solar heat steam turbine 32 are included, and part of feed water can be delivered to the solar heat steam turbine 32 as steam in the heat collecting steam generator 31, so as to drive the solar heat steam turbine 32 to generate power.

Further, in the steam turbine power plant 10 of the first embodiment, the fuel consumption reduction owing to the solar heat steam turbine 32 can be increased by including the heat accumulator 34.

Moreover, with the steam turbine power plant 10 of the first embodiment, steam with low exergy after performing expansion work in the solar heat steam turbine 32 can be used as energy needed in the recovery tower 80 of the carbon dioxide collecting facility 60. Thus, losses of energy can be suppressed, and high power generating efficiency can be obtained.

Here, in the above-described steam turbine power plant 10, the solar heat steam turbine 32 is connected along the same axis as the low-pressure turbine 24 and is structured to drive the generator 35a, and the high-pressure turbine 22 is connected along the same axis as the intermediate-pressure turbine 23 and is structured to drive the generator 35b. However, the arrangements and structures of the steam turbines are not limited to them. For example, the solar heat steam turbine 32 may be disposed to be connected along the same axis as the high-pressure turbine 22 and the intermediate-pressure turbine 23. The solar heat steam turbine 32 may also be disposed solely to have a sole generator. Moreover, a tandem compound structure may be provided, in which the high-pressure turbine 22, the intermediate-pressure turbine 23, the low-pressure turbine 24, and the solar heat steam turbine 32 are connected along the same axis.

It may be structured to increase the rotation speed by connecting gears when the solar heat steam turbine 32 is connected. Thus, the solar heat steam turbine 32 can be reduced in size and enhanced in performance.

The low-pressure turbine 24 may be operated at a half speed, that is, 1800 rpm or 1500 rpm compared to normal 3600 rpm or 3000 rpm to reduce the centrifugal force, and long blades may be employed as turbine rotor blades of the final turbine stage. Thus, an exhaust axial velocity can be reduced and an exhaust loss can be decreased. Here, an exhaust annular area, an exhaust axial velocity and an exhaust loss can be defined by the following equations (equation (1) to equation (3)).

$$\text{Exhaust annular area} = \text{blade length } (m) \times \text{average diameter } (m) \times \pi \quad \text{equation (1)}$$

$$\text{Exhaust axial velocity} = \text{exhaust volumetric flow rate } (m^3/s)/\text{exhaust annular area } (m^2) \quad \text{equation (2)}$$

$$\text{Exhaust loss} = A/2g \times \text{exhaust mass flow rate } (kg/s) \times (\text{exhaust axial velocity})^2 \quad (3)$$

Here, A is constant and g is gravitational acceleration.

[Second Embodiment]

Figure 5:
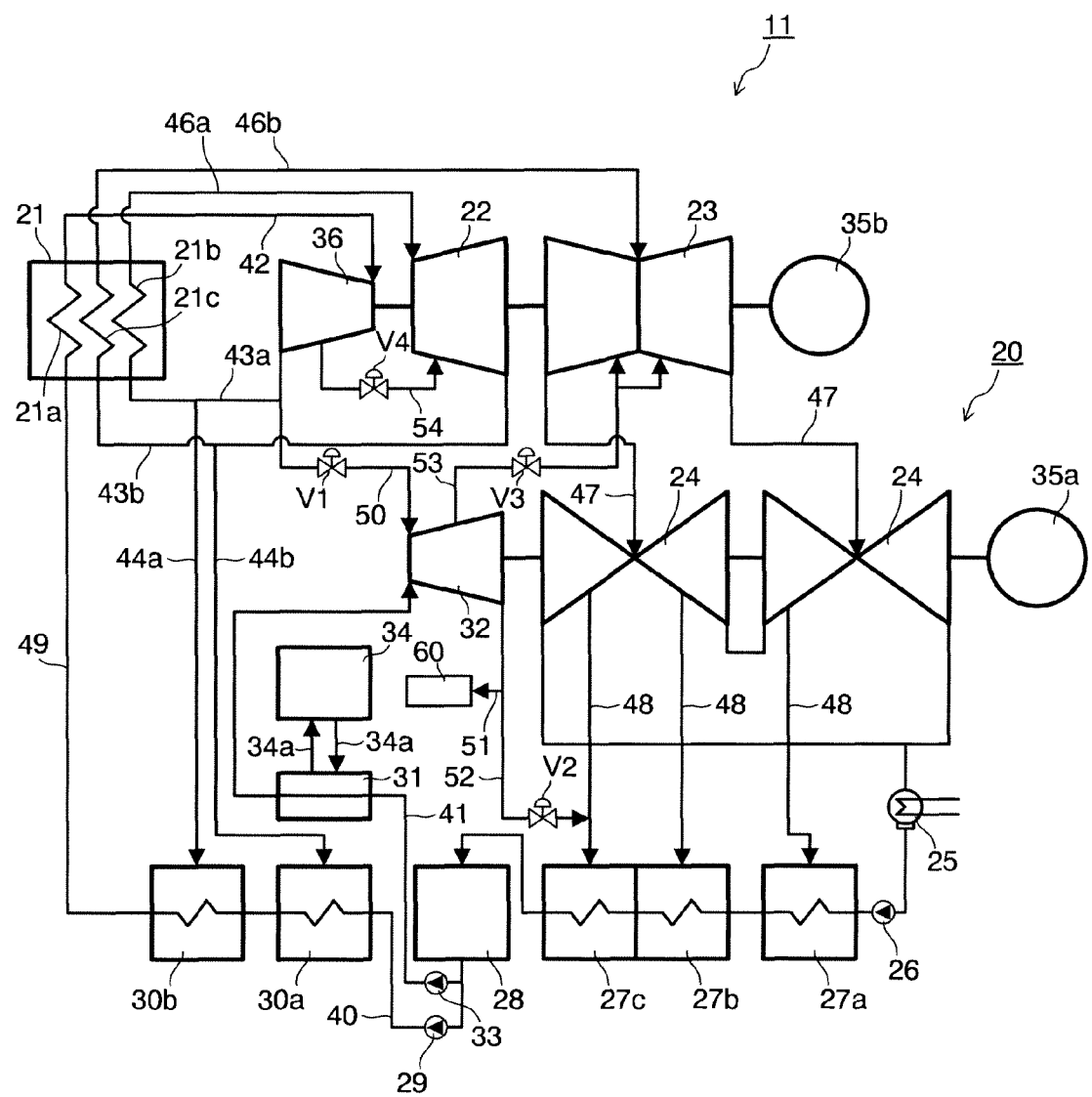
FIG. 5 is a diagram illustrating an overview of a steam turbine power plant of a second embodiment.

FIG. 5 is a diagram illustrating an overview of a steam turbine power plant 11 of a second embodiment. Note that the same components as those of the steam turbine power plant 10 of the first embodiment are denoted by the same reference numerals, and duplicated descriptions are omitted or simplified.

The steam turbine power plant 11 of the second embodiment includes a steam turbine facility 20 in which power is generated by driving steam turbines with steam from a boiler 21 generating steam utilizing combustion heat and steam from a heat collecting steam generator 31 generating steam utilizing heat of sunlight, and a carbon dioxide collecting facility 60 in which carbon dioxide contained in combustion gas from the boiler 21 and the like is collected.

First the steam turbine facility 20 will be described.

As illustrated in FIG. 5, the steam turbine facility 20 includes a boiler 21 having a super heater 21a and reheaters 21b, 21c, a superhigh-pressure turbine 36 functioning as the first steam turbine, a high-pressure turbine 22 functioning as one of two steam turbines constituting the second steam turbine, an intermediate-pressure turbine 23 functioning as the other of the two steam turbines constituting the second steam turbine, a low-pressure turbine 24 functioning as the third steam turbine, a steam condenser 25, a condensate pump 26, low-pressure feed water heaters 27a, 27b, 27c, a deaerator 28, a boiler feed water pump 29, and high-pressure feed water heaters 30a, 30b.

Further, the steam turbine facility 20 includes a heat collecting steam generator 31 generating steam from part of feed water deaerated in the deaerator 28, and a solar heat steam turbine 32 functioning as the fourth steam turbine to which steam generated in this heat collecting steam generator 31 is delivered. Further, it is structured such that part of steam exhausted from the solar heat steam turbine 32 is supplied to the carbon dioxide collecting facility 60.

The heat collecting steam generator 31 includes, for example, a heating mechanism heating a liquid heat medium by sunlight, a heat exchanger heating feed water by the heat medium supplied from this heating mechanism, a circulating pump provided on a pipe which circulates the heat medium to the heating mechanism and the heat exchanger, and so on. For the heat collecting steam generator 31, for example as described above, a trough-type solar thermal collector or a tower-type solar thermal collector can be used for example.

In addition, similarly to the steam turbine power plant 10 of the first embodiment, a heat accumulator 34 accumulating part of a heat of steam generated in the heat collecting steam generator 31 may be provided between the heat collecting steam generator 31 and the solar heat steam turbine 32.

Here, the solar heat steam turbine 32 is connected along the same axis as the low-pressure turbine 24 and is structured to drive a generator 35a. The superhigh-pressure turbine 36 is connected along the same axis as the high-pressure turbine 22 and the intermediate-pressure turbine 23 and is structured to drive a generator 35b. By thus disposing the steam turbines, it is possible to suppress the entire length from becoming long, and thereby reduce steam leakage due to a difference in thermal expansion between turbine rotors and stationary members. Moreover, by separately having the steam turbine to which high-temperature steam is delivered and the steam turbine to which relatively low-temperature steam is delivered, and disposing a thrust bearing in each of them appropriately, start-up characteristics can be improved.

Note that the arrangements and structures of the steam turbines are not limited to the above-described structures. Structures similar to the other arrangements and structures illustrated in the steam turbine power plant 10 of the first embodiment may be employed In this steam turbine facility 20, high-temperature steam generated in the super heater 21a of the boiler 21 is delivered to the superhigh-pressure turbine 36 via a main steam pipe 42, performs expansion work, and is delivered thereafter to the reheater 21b of the boiler 21 via a low-temperature reheat steam pipe 43a. Here, the temperature of the steam delivered from the superheater 21a to the superhigh-pressure turbine 36 is preferred to be 620° C. or higher in view of improving power generating efficiency. For example, it is also possible to deliver high-temperature steam at a temperature of about 650° C. or higher to the superhigh-pressure turbine 36. Part of steam exhausted from the superhigh-pressure turbine 36 is delivered to the high-pressure feed water heater 30b via a pipe 44a branched from the low-temperature reheat steam pipe 43a, which delivers the steam exhausted from the superhigh-pressure turbine 36 to the reheater 21b, so as to heat the feed water.

The steam heated again (reheated) to be superheated steam at a high temperature in the reheater 21b is delivered to the high-pressure turbine 22 via a high-temperature reheat steam pipe 46a, performs expansion work, and is delivered thereafter to the reheater 21c of the boiler 21 via a low-temperature reheat steam pipe 43b. Here, the temperature of the steam delivered from the reheater 21b to the high-pressure turbine 22 is preferred to be 620° C. or higher in view of improving power generating efficiency. For example, it is also possible to deliver high-temperature steam at a temperature of about 650° C. or higher to the high-pressure turbine 22. Part of steam exhausted from the high-pressure turbine 22 is delivered to the high-pressure feed water heater 30a via a pipe 44b branched from the low-temperature reheat steam pipe 43b, which delivers the steam exhausted from the high-pressure turbine 22 to the reheater 21c, so as to heat the feed water.

Here, when the temperature of the steam exhausted from the high-pressure turbine 22 is higher than a predetermined temperature of steam delivered to the high-pressure feed water heater 30a, it is preferred to provide a heat exchanger (not illustrated) capable of exchanging heat between feed water that flows in a feed water pipe 49 between the high-pressure feed water heater 30a and the super heater 21a of the boiler 21 and steam that flows in the pipe 44b delivering the steam exhausted from the high-pressure turbine 22 to the high-pressure feed water heater 30a. Thus, steam at an appropriate temperature can be delivered to the high-pressure feed water heater 30a.

In addition, steam extracted from the superhigh-pressure turbine 36 may be delivered to a predetermined turbine stage of the high-pressure turbine 22 via a pipe 54 as cooling steam for cooling a turbine rotor, turbine rotor blades, a casing, and so on of the high-pressure turbine 22. Thus, the creep strengths of the turbine rotor and the turbine rotor blades of the high-pressure turbine 22 can be assured.

The steam heated again (reheated) to be superheated steam at a high temperature in the reheater 21c is delivered to the intermediate-pressure turbine 23 via a high-temperature reheat steam pipe 46b, performs expansion work, and is delivered thereafter to the low-pressure turbine 24 via a pipe 47. Here, it is preferred that the temperature of the steam heated in the reheater 21c and delivered to the intermediate-pressure turbine 23 be 620° C. or higher in view of improving power generating efficiency. For example, high-temperature steam at about 650° C. or higher can be delivered to the intermediate-pressure turbine 23. The intermediate-pressure turbine 23 drives the generator 35b to generate power.

The steam delivered to the low-pressure turbine 24 and performed expansion work is led to the steam condenser 25 to be condensed into condensate. Extraction steam extracted from the low-pressure turbine 24 is led to the low-pressure feed water heaters 27a, 27b, 27c via a pipe 48 to heat the feed water. The low-pressure turbine 24 drives the generator 35a to generate power.

The condensate in the steam condenser 25 is delivered to the low-pressure feed water heaters 27a, 27b, 27c and the deaerator 28 by the condensate pump 26 and reused as feed water to the boiler 21. The condensate delivered to the deaerator 28 is pressurized by the boiler feed water pump 29 and is supplied via the feed water pipe 49 to the super heater 21a through the high-pressure feed water heaters 30a, 30b. On the other hand, part of the feed water (condensate) delivered to the deaerator 28 is delivered to the heat collecting steam generator 31 by a feed water pump 33 via a pipe 41 branched from a water supply system pipe 40. The feed water delivered to the heat collecting steam generator 31 is heated in the heat collecting steam generator 31 and turns to steam, and is delivered to the solar heat steam turbine 32.

For example, when the heat accumulator 34 is included, if the solar heat energy obtained by the heat collecting steam generator 31 surpasses a necessary amount, the circulating pump (not illustrated) provided on the circulation pipe 34a is actuated to accumulate heat in the heat accumulator 34. A predetermined amount of solar heat energy is then given to the feed water via a heat medium from the heat collecting steam generator 31, thereby enabling to deliver steam at an appropriate temperature to the solar heat steam turbine 32.

On the other hand, when the heat accumulator 34 is included and the heat accumulator 34 has already accumulated heat, if the solar heat energy obtained by the heat collecting steam generator 31 is lower than a necessary amount, the circulating pump (not illustrated) provided on the circulation pipe 34a is actuated to use in the heat collecting steam generator 31 the heat accumulated in the heat accumulator 34. A predetermined amount of solar heat energy is then given to the feed water via a heat medium from the heat collecting steam generator 31, thereby enabling to deliver steam at an appropriate temperature to the solar heat steam turbine 32.

Here, there may be provided a pipe 50 branched from the low-temperature reheat steam pipe 43a, which delivers the steam exhausted from the superhigh-pressure turbine 36 to the reheater 21b, and communicating with a steam inlet of the solar heat steam turbine 32. For example, when the heat accumulator 34 is not included, or when the heat accumulator 34 is included but the energy given to the feed water is not sufficient by only the heat accumulated in the heat accumulator 34, part of the steam exhausted from the superhigh-pressure turbine 36 can be delivered to the solar heat steam turbine 32 via the pipe 50. Here, it is preferred that the steam delivered to the solar heat steam turbine 32 be at a temperature close to that of the steam generated by the heat collecting steam generator 31. For example, the steam may be at a temperatures within the range of 370° C. to 400° C. when the heat collecting steam generator 31 is the trough type, and may be at a temperature within the range of 500° C. to 550° C. when the heat collecting steam generator 31 is the tower type.

The steam delivered to the solar heat steam turbine 32 performs expansion work, and thereafter part thereof is supplied to the carbon dioxide collecting facility 60 via a pipe 51. The rest is delivered to the low-pressure feed water heater 27c via a pipe 52 branched from the pipe 51 together with the above-described extraction steam extracted from the low-pressure turbine 24.

Here, steam extracted from the solar heat steam turbine 32 may be delivered to a predetermined turbine stage of the intermediate-pressure turbine 23 via a pipe 53 as cooling steam for cooling a turbine rotor, turbine rotor blades, a casing, and so on of the intermediate-pressure turbine 23. Thus, the creep strengths of the turbine rotor and the turbine rotor blades of the intermediate-pressure turbine 23 can be assured. Further, by utilizing the cooling steam at a low temperature extracted from the solar heat steam turbine 32, a cycle loss can be reduced. In addition, when steam from the solar heat steam turbine 32 is extracted to cool the intermediate-pressure turbine 23, it is preferred to extract from the solar heat steam turbine 32 steam at a pressure higher than the pressure of the steam in a cooling part of the intermediate-pressure turbine 23.

Here, the pipe 50 is provided with a flow regulating valve V1 for adjusting the flow rate of the steam delivered to the solar heat steam turbine 32. Also the pipe 52 is provided with a pressure regulating valve V2 for adjusting the pressure of the steam exhausted from the solar heat steam turbine 32. Further, when steam extracted from the solar heat steam turbine 32 is delivered to the intermediate-pressure turbine 23 as cooling steam, the pipe 53 is provided with a flow regulating valve V3 for adjusting the flow rate of extracted steam from the solar heat steam turbine 32. Moreover, when the steam extracted from the superhigh-pressure turbine 36 is delivered to the high-pressure turbine 22 as cooling steam, the pipe 54 is provided with a flow regulating valve V4 for adjusting the flow rate of extracted steam from the superhigh-pressure turbine 36.

In addition, with respect to the output of generated power in the steam turbine power plant 11, the flow rate of main steam delivered to the superhigh-pressure turbine 36 is adjusted with a steam control valve (not illustrated) so that the total output of the generator 35a and the generator 35b corresponds to a target output. Further, the above-described valves, pumps, and so on are feedback controlled by a not-illustrated control device based on information from, for example, a temperature sensing device, a flow sensing device, a pressure sensing device, and so on, which are not illustrated.

For example, the flow rate and the temperature of steam delivered to the carbon dioxide collecting facility 60 is adjusted to be a predetermined flow rate and a predetermined temperature by the control device controlling the pressure regulating valve V2 and so on. Specifically, when the temperature of the steam exhausted from the solar heat steam turbine 32 is lower than the temperature of steam needed in the carbon dioxide collecting facility 60, for example the pressure regulating valve V2 is closed to increase the pressure of the steam exhausted from the solar heat steam turbine 32. Thus, the temperature of the steam exhausted from the solar heat steam turbine 32 can be increased to be close to the predetermined temperature. In addition, when small adjustment of the temperature is needed, for example, part of the pipe 51 may be cooled by spray water or the like to perform the temperature adjustment. When the flow rate of the steam delivered to the carbon dioxide collecting facility 60 is lower than a predetermined flow rate, for example, the amount of feed water from the feed water pump 33 can be increased or the opening of the flow regulating valve V1 can be increased to make it close to the predetermined flow rate.

Note that although the example of adjusting the flow regulating valve V1 and the pressure regulating valve V2 based on the temperature and the flow rate of the steam delivered to the carbon dioxide collecting facility 60 has been described here, the flow regulating valve V1 and the pressure regulating valve V2 may be adjusted based on, for example, the temperature of the absorbing liquid in the recovery tower of the carbon dioxide collecting facility 60, which will be described later. By thus adjusting the flow regulating valve V1 and the pressure regulating valve V2 based on the temperature of the absorbing liquid, it is possible to reduce a time delay for performing appropriate control. In this situation, the flow regulating valve V1 and the pressure regulating valve V2 may be controlled regarding the flow rate of the absorbing liquid as a function, in order to stabilize the control.

Note that the structure and the operation and effect of the carbon dioxide collecting facility 60 are the same as those of the carbon dioxide collecting facility 60 in the steam turbine power plant 10 of the first embodiment.

Next, the cycle efficiency in the steam turbine power plant 11 of the second embodiment will be described.

Figure 6:
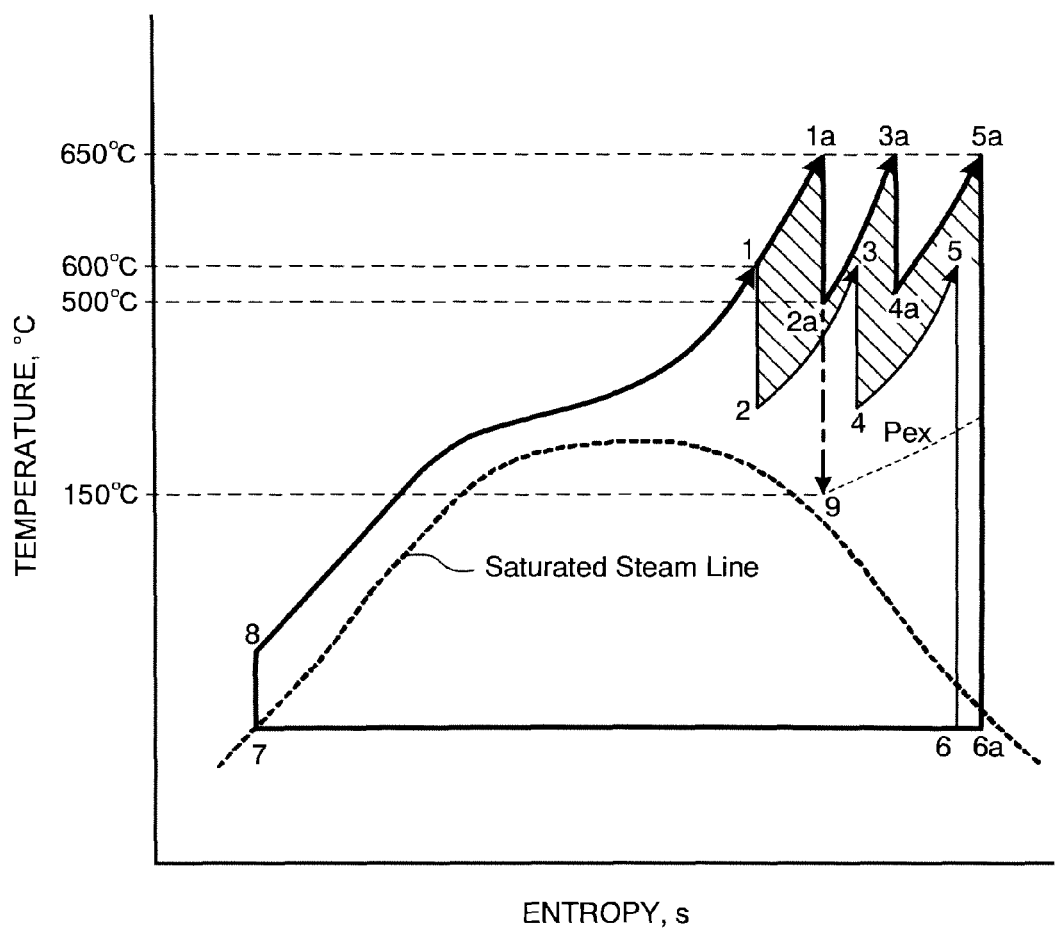
FIG. 6 is a diagram illustrating state changes of steam in the steam turbine power plant of the second embodiment by a T-s line chart (temperature-entropy line chart).

FIG. 6 is a diagram illustrating state changes of steam in the steam turbine power plant 11 of the second embodiment by a T-s line chart (temperature-entropy line chart). Note that FIG. 6 also illustrates state changes in a conventional two-stage reheat cycle for comparison. Here, an example is described in which the temperature of the steam delivered to the superhigh-pressure turbine 36 of the steam turbine power plant 11 of the second embodiment is 650° C., and the temperature of steam delivered to a superhigh-pressure turbine in a conventional steam turbine power plant is 600° C. Further, in FIG. 6, similarly to FIG. 3, the expansion process in each steam turbine is assumed to be adiabatic expansion.

In the conventional steam turbine power plant, 8->1 denotes isobaric temperature increase in a boiler 21, 1->2 denotes adiabatic expansion in the superhigh-pressure turbine, 2->3 denotes isobaric reheating in a reheater, 3->4 denotes adiabatic expansion in a high-pressure turbine, 4->5 denotes isobaric reheating in the reheater, and 5->6 denotes adiabatic expansion in an intermediate-pressure turbine and a low-pressure turbine. Further, 6->7 denotes an isobaric condensation in a steam condenser, and 7->8 denotes pressure increase and temperature increase in a feed water pump and a feed water heater.

On the other hand, in the steam turbine power plant 11 of the second embodiment, since the temperature of the steam delivered to the superhigh-pressure turbine 36 is higher than the temperature of steam delivered to the superhigh-pressure turbine in the conventional steam turbine power plant, adiabatic expansion in the superhigh-pressure turbine 36 is 1a->2a. Adiabatic expansion in the high-pressure turbine 22 is 3a->4a. Adiabatic expansion in the intermediate-pressure turbine 23 and the low-pressure turbine 24 is 5a->6a.

In FIG. 6, the area surrounded by steam state values higher than conventional steam state values (area of the portion denoted by oblique lines in FIG. 6) is an energy increment that can be taken out as work, that is, an amount of contribution to efficiency improvement owing to the temperature increase.

Further, adiabatic expansion in the solar heat steam turbine 32 is represented by 2a->9, and the temperature of the steam exhausted from the solar heat steam turbine 32 is determined by the pressure Pex of the exhausted steam. Here, the temperature and pressure of steam generated in the heat collecting steam generator 31 are substantially the same as the temperature and pressure of the steam exhausted from the superhigh-pressure turbine 36, and thus steam delivered from either of them to the solar heat steam turbine 32 is under a steam condition 2a.

Further, for example, when the temperature of the steam exhausted from the solar heat steam turbine 32 is lower than the temperature (for example, 150° C.) of steam needed in the carbon dioxide collecting facility 60, the pressure regulating valve V2 is closed to increase the pressure Pex of the steam exhausted from the solar heat steam turbine 32. Thus, the temperature of the steam exhausted from the solar heat steam turbine 32 can be increased to be close to the predetermined temperature. When the flow rate of the steam delivered to the carbon dioxide collecting facility 60 is lower than a predetermined flow rate, for example, the amount of feed water from the feed water pump 33 can be increased or the opening of the flow regulating valve V1 can be increased, so as to make the flow rate be close to the predetermined flow rate.

By the above-described control, the output of the entire steam turbine power plant 10 is determined by the total output of the generator 35a and the generator 35b. Accordingly, obtaining a predetermined output is possible by controlling the flow rate of the steam delivered to the superhigh-pressure turbine 36 by a steam control valve (not illustrated) and thereby controlling outputs of the generators 35a, 35b.

In addition, when the steam turbine power plant 10 is operated with the steam delivered to the reboiler 130 being cut off for the purpose of replacing the absorbing liquid 100 of the carbon dioxide collecting facility 60, or the like, a shut-off valve (not illustrated) provided on the pipe 51 is closed to shut off the flow of steam into the carbon dioxide collecting facility 60. Moreover, the pressure regulating valve V2 is fully opened to control the whole amount of the steam exhausted from the solar heat steam turbine 32 to be delivered to the low-pressure feed water heater 27c.

As described above, in the steam turbine power plant 11 of the second embodiment, the heat collecting steam generator 31 and the solar heat steam turbine 32 are included, and part of feed water can be delivered to the solar heat steam turbine 32 as steam in the heat collecting steam generator 31, so as to drive the solar heat steam turbine 32 to generate power.

Further, in the steam turbine power plant 11 of the second embodiment, the fuel consumption reduction owing to the solar heat steam turbine 32 can be increased by including the heat accumulator 34.

Moreover, with the steam turbine power plant 11 of the second embodiment, steam with low energy after performing expansion work in the solar heat steam turbine 32 can be used as energy needed in the recovery tower 80 of the carbon dioxide collecting facility 60. Thus, losses of energy can be suppressed, and high power generating efficiency can be obtained.

[Third Embodiment]

Figure 7:
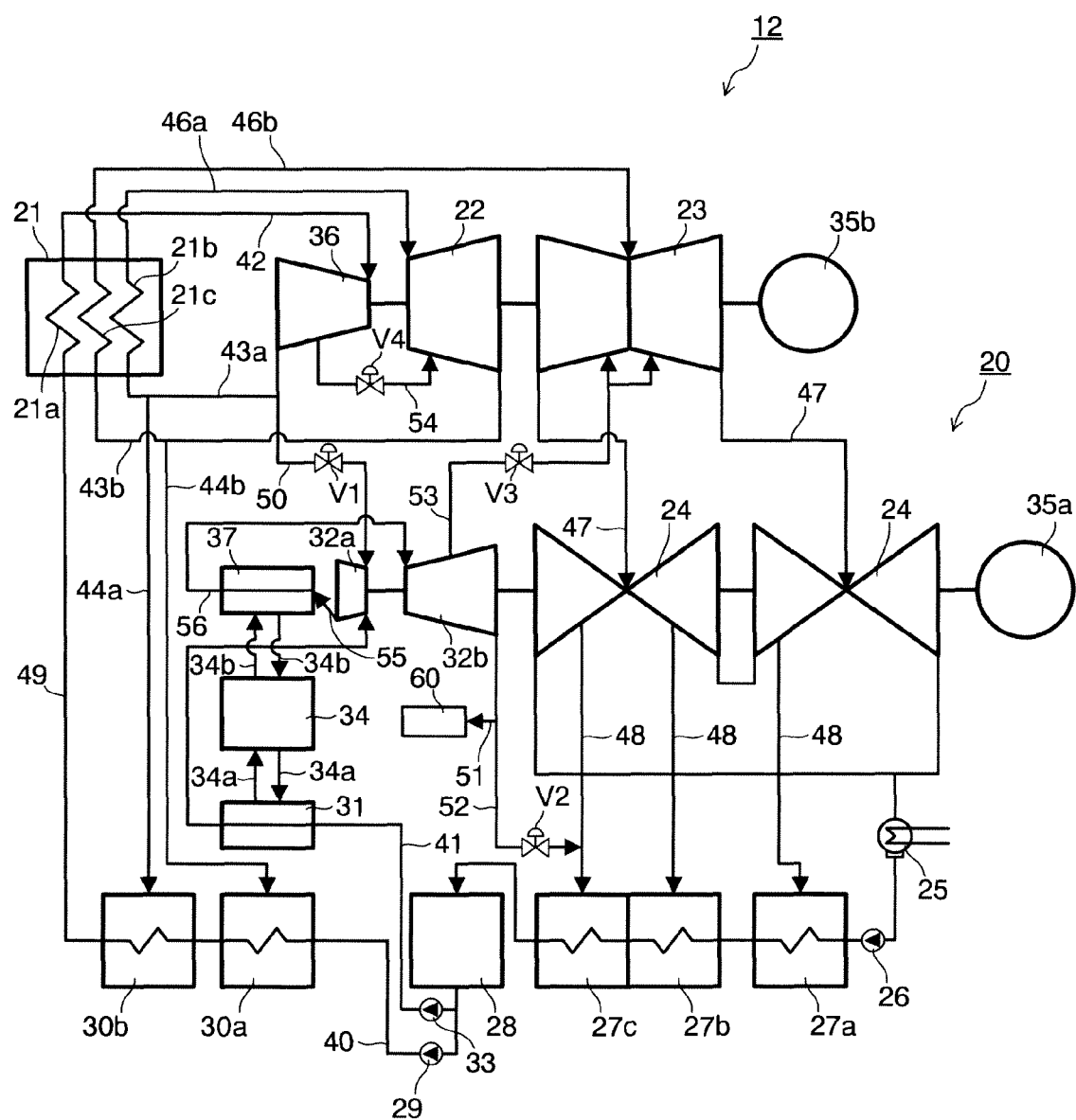
FIG. 7 is a diagram illustrating an overview of a steam turbine power plant of a third embodiment.
Figure 8:
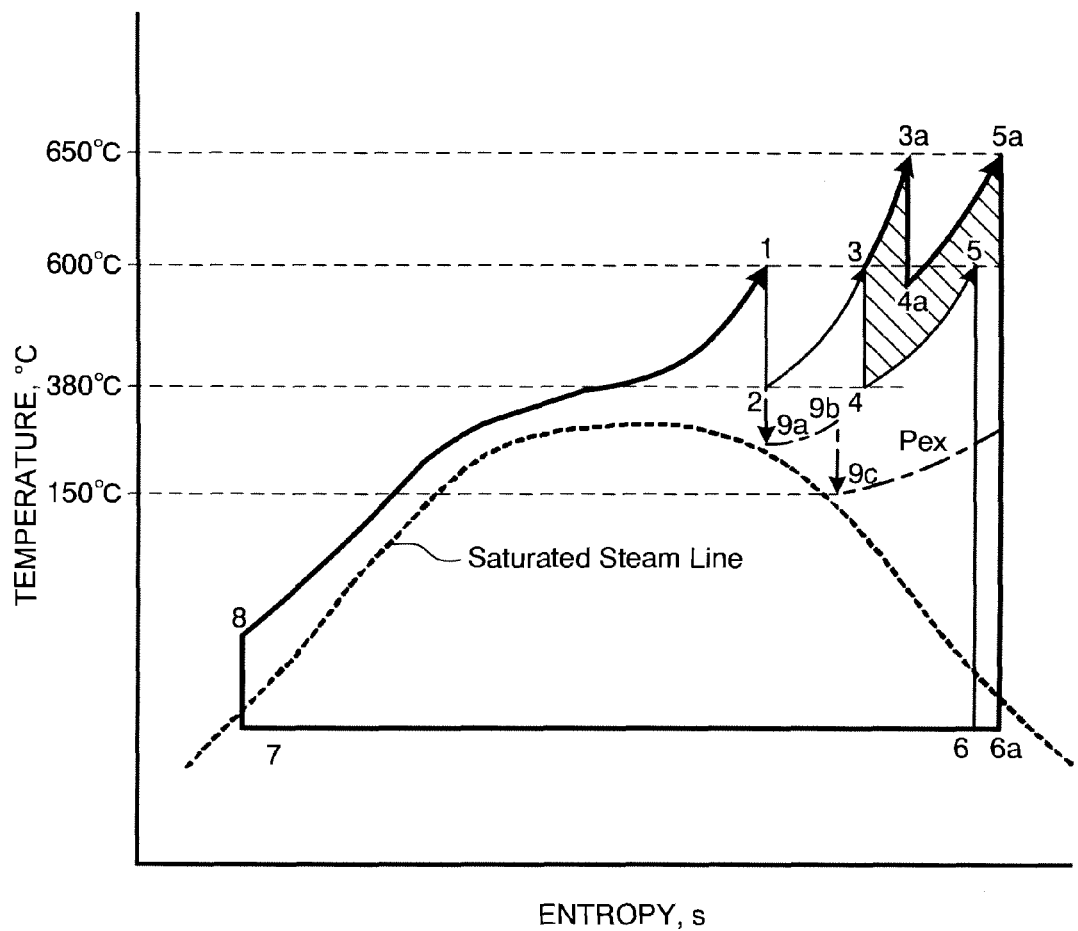
FIG. 8 is a diagram illustrating state changes of steam in the steam turbine power plant of the third embodiment by a T-s line chart (temperature-entropy line chart).
Figure 9:
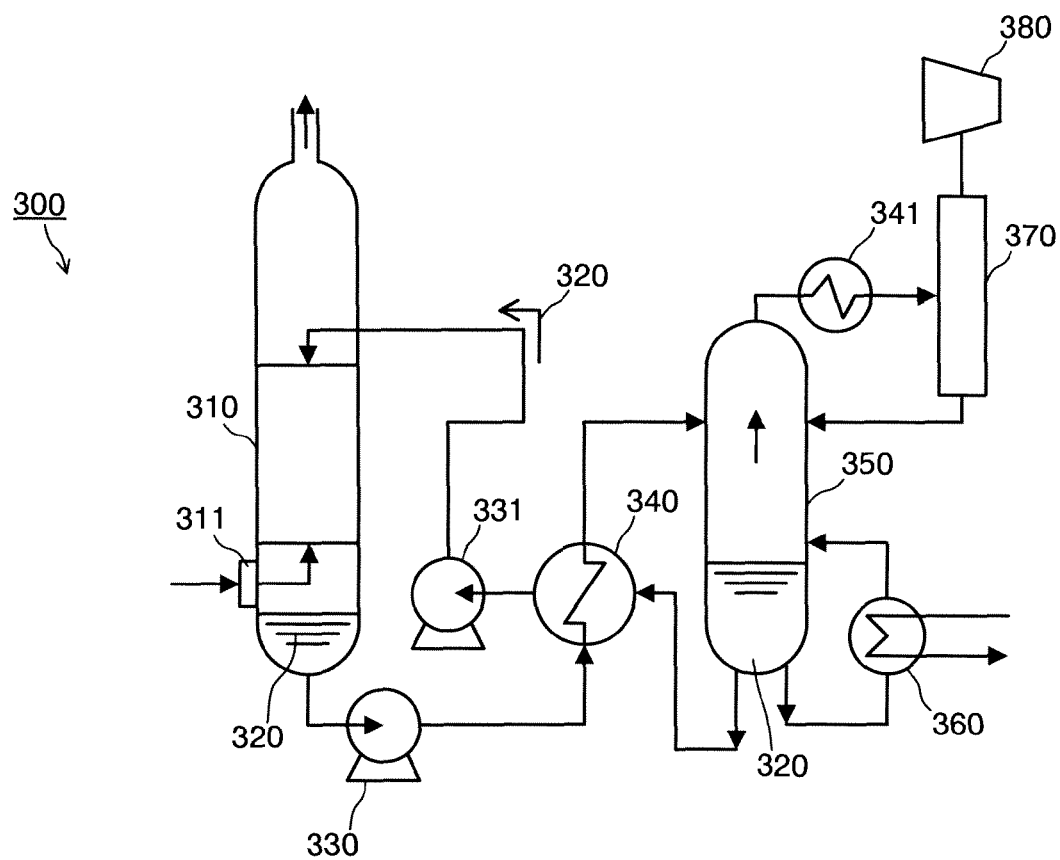
FIG. 9 is a diagram illustrating an example of a conventional carbon dioxide collecting system which removes and collects carbon dioxide in combustion exhaust gas.

FIG. 7 is a diagram illustrating an overview of a steam turbine power plant 12 of a third embodiment. FIG. 8 is a diagram illustrating state changes of steam in the steam turbine power plant 12 of the third embodiment according to the present invention by a T-s line chart (temperature-entropy line chart). Note that FIG. 8 also illustrates state changes in a conventional two-stage reheat cycle for comparison. Further, the same components as those of the steam turbine power plants 10, 11 of the first embodiment and the second embodiment are denoted by the same reference numerals, and duplicated descriptions are omitted or simplified. In addition, in FIG. 8, similarly to FIG. 3, the expansion process in each steam turbine is assumed to be adiabatic expansion.

The steam turbine power plant 12 of the third embodiment is structured similarly to the steam turbine power plant 11 of the second embodiment except that the solar heat steam turbine 32 of the steam turbine power plant 11 of the second embodiment is structured as a reheat turbine and that a heat collecting steam generator is included as a reheater.

Here, it is assumed that the temperature of steam delivered to the superhigh-pressure turbine 36 is about 600° C., and the temperature of steam exhausted from the superhigh-pressure turbine 36 is lower than the temperature of steam exhausted from the superhigh-pressure turbine 36 of the steam turbine power plant 11 of the above-described second embodiment. Further, when it is attempted to change the temperature of the steam exhausted from the solar heat steam turbine 32 to a temperature required in the carbon dioxide collecting facility 60 (for example, 150° C.), it is assumed that the state of steam belongs to a moist region (region lower than a saturated steam line illustrated in FIG. 8). When the state of exhausted steam thus belongs to a moist region, there arise problems of, for example, erosion of rotor blades and stator blades of the final turbine stage, and the like, and the reliability of the steam turbines becomes low.

In addition, when exhaust pressure of the steam exhausted from the solar heat steam turbine 32 is increased, the steam can be made higher than the saturation temperature. However, depressurization and temperature reduction of the exhausted steam is needed for making the temperature of the exhausted steam to be about 150° C., which is a loss of energy.

Accordingly, the steam turbine power plant 12 of the third embodiment includes, as illustrated in FIG. 7, a reheat solar heat steam turbine including solar heat steam turbines 32a, 32b, and a heat collecting steam generator 37 as a reheater. In addition, this heat collecting steam generator 37 is constituted of the same heat collecting steam generator as the heat collecting steam generator 31.

A circulation pipe 34a circulating the heat medium of the heat collecting steam generator 31 is provided between the heat collecting steam generator 31 and the heat accumulator 34. A circulation pipe 34b circulating the heat medium of the heat collecting steam generator 31 is provided between the heat collecting steam generator 37 and the heat accumulator 34. When heat is accumulated in the heat accumulator 34, or when the heat accumulated in the heat accumulator 34 is used in the heat collecting steam generator 31, circulating pumps (not illustrated) provided on the circulation pipe 34a and the circulation pipe 34b are actuated to accumulate heat or to discharge the accumulated heat. By thus including the heat accumulator 34, it is possible to accumulate excessive heat once in the heat accumulator 34 for example when the amount of insolation is large. On the other hand, when a predetermined solar heat energy amount cannot be obtained at night or due to a small amount of insolation, the accumulated heat can be taken out. That is, by including the heat accumulator 34, a variation of solar heat can be absorbed and equalized.

Although the example of including the circulation pipe 34a and the circulation pipe 34b in parallel has been described here, the connection between the heat collecting steam generator 31 and the heat accumulator 34 and the connection between the heat collecting steam generator 37 and the heat accumulator 34 may be formed in series with one circulation pipe.

In this steam turbine facility 20, high-temperature steam generated in the super heater 21a of the boiler 21 is delivered to the superhigh-pressure turbine 36 via a main steam pipe 42, performs expansion work, and is delivered thereafter to the reheater 21b of the boiler 21 via a low-temperature reheat steam pipe 43a. Here, the temperature of the steam delivered from the super heater 21a to the superhigh-pressure turbine 36 is about 600° C. as described above. Part of steam exhausted from the superhigh-pressure turbine 36 is delivered to the high-pressure feed water heater 30b via a pipe 44a branched from the low-temperature reheat steam pipe 43a, which delivers the steam exhausted from the superhigh-pressure turbine 36 to the reheater 21b, so as to heat the feed water.

The steam heated again (reheated) to be superheated steam at a high temperature in the reheater 21b is delivered to the high-pressure turbine 22 via a high-temperature reheat steam pipe 46a, performs expansion work, and is delivered thereafter to the reheater 21c of the boiler 21 via a low-temperature reheat steam pipe 43b. Here, the temperature of the steam delivered from the reheater 21b to the high-pressure turbine 22 is preferred to be 620° C. or higher in view of improving power generating efficiency. For example, it is also possible to deliver high-temperature steam at a temperature of about 650° C. or higher to the high-pressure turbine 22. Part of steam exhausted from the high-pressure turbine 22 is delivered to the high-pressure feed water heater 30a via a pipe 44b branched from the low-temperature reheat steam pipe 43b, which delivers the steam exhausted from the high-pressure turbine 22 to the reheater 21c, so as to heat the feed water.

Here, when the temperature of the steam exhausted from the high-pressure turbine 22 is higher than a predetermined temperature of steam delivered to the high-pressure feed water heater 30a, it is preferred to provide a heat exchanger (not illustrated) capable of exchanging heat between feed water that flows in a feed water pipe 49 between the high-pressure feed water heater 30a and the super heater 21a of the boiler 21 and steam that flows in the pipe 44b delivering the steam exhausted from the high-pressure turbine 22 to the high-pressure feed water heater 30a. Thus, steam at an appropriate temperature can be delivered to the high-pressure feed water heater 30a.

In addition, extraction steam extracted from the superhigh-pressure turbine 36 maybe delivered to a predetermined turbine stage of the high-pressure turbine 22 via a pipe 54 as cooling steam for cooling a turbine rotor, turbine rotor blades, a casing, and so on of the high-pressure turbine 22. Thus, the creep strengths of the turbine rotor and the turbine rotor blades of the high-pressure turbine 22 can be assured.

The steam heated again (reheated) to be superheated steam at a high temperature in the reheater 21c is delivered to the intermediate-pressure turbine 23 via a high-temperature reheat steam pipe 46b, performs expansion work, and is delivered thereafter to the low-pressure turbine 24 via a pipe 47. Here, it is preferred that the temperature of the steam heated in the reheater 21c and delivered to the intermediate-pressure turbine 23 be 620° C. or higher in view of improving power generating efficiency. For example, high-temperature steam at about 650° C. or higher can be delivered to the intermediate-pressure turbine 23. The intermediate-pressure turbine 23 drives the generator 35b to generate power.

The steam delivered to the low-pressure turbine 24 and performed expansion work is led to the steam condenser 25 to be condensed into condensate. Extraction steam extracted from the low-pressure turbine 24 is led to the low-pressure feed water heaters 27a, 27b, 27c via a pipe 48 to heat the feed water. The low-pressure turbine 24 drives the generator 35a to generate power.

The condensate in the steam condenser 25 is delivered to the low-pressure feed water heaters 27a, 27b, 27c and the deaerator 28 by the condensate pump 26 and reused as feed water to the boiler 21. The condensate delivered to the deaerator 28 is pressurized by the boiler feed water pump 29 and is supplied via the feed water pipe 49 to the super heater 21a through the high-pressure feed water heaters 30a, 30b. On the other hand, part of the feed water (condensate) delivered to the deaerator 28 is delivered to the heat collecting steam generator 31 by a feed water pump 33 via a pipe 41 branched from a water supply system pipe 40. The feed water delivered to the heat collecting steam generator 31 is heated in the heat collecting steam generator 31 and turns to steam, and is delivered to the solar heat steam turbine 32.

For example, when the heat accumulator 34 is included, if the solar heat energy obtained by the heat collecting steam generator 31 surpasses a necessary amount, the circulating pump (not illustrated) provided on the circulation pipe 34a is actuated to accumulate heat in the heat accumulator 34. A predetermined amount of solar heat energy is then given to the feed water via a heat medium from the heat collecting steam generator 31, thereby enabling to deliver steam at an appropriate temperature to the solar heat steam turbine 32a.

On the other hand, when the heat accumulator 34 is included and the heat accumulator 34 has already accumulated heat, if the solar heat energy obtained by the heat collecting steam generator 31 is lower than a necessary amount, the circulating pump (not illustrated) provided on the circulation pipe 34a is actuated to use in the heat collecting steam generator 31 the heat accumulated in the heat accumulator 34. A predetermined amount of solar heat energy is then given to the feed water via a heat medium from the heat collecting steam generator 31, thereby enabling to deliver steam at an appropriate temperature to the solar heat steam turbine 32a.

Here, there may be provided a pipe 50 branched from the low-temperature reheat steam pipe 43a, which delivers the steam exhausted from the superhigh-pressure turbine 36 to the reheater 21b, and communicating with a steam inlet of the solar heat steam turbine 32a. For example, when the heat accumulator 34 is not included, or when the heat accumulator 34 is included but the energy given to the feed water is not sufficient by only the heat accumulated in the heat accumulator 34, part of the steam exhausted from the superhigh-pressure turbine 36 can be delivered to the solar heat steam turbine 32a via the pipe 50. Here, it is preferred that the steam delivered to the solar heat steam turbine 32 be at a temperature close to that of the steam generated by the heat collecting steam generator 31. For example, the steam may be at a temperature within the range of 370° C. to 400° C.

The steam delivered to the solar heat steam turbine 32a performs expansion work, and thereafter is delivered to the heat collecting steam generator 37 via a low-temperature reheat steam pipe 55 to be heated therein. The steam heated in the heat collecting steam generator 37 is delivered to the solar heat steam turbine 32b via a high-temperature reheat steam pipe 56.

The steam delivered to the solar heat steam turbine 32b performs expansion work, and thereafter part thereof is supplied to the carbon dioxide collecting facility 60 via a pipe 51. The rest is delivered to the low-pressure feed water heater 27c via a pipe 52 branched from the pipe 51 together with the above-described extraction steam extracted from the low-pressure turbine 24.

Here, steam extracted from the solar heat steam turbine 32b may be delivered to a predetermined turbine stage of the intermediate-pressure turbine 23 via a pipe 53 as cooling steam for cooling a turbine rotor, turbine rotor blades, a casing, and so on of the intermediate-pressure turbine 23. Thus, the creep strengths of the turbine rotor and the turbine rotor blades of the intermediate-pressure turbine 23 can be assured. Further, by utilizing the cooling steam at a low temperature extracted from the solar heat steam turbine 32b, a cycle loss can be reduced.

Here, the pipe 50 is provided with a flow regulating valve V1 for adjusting the flow rate of the steam delivered to the solar heat steam turbine 32a. Also the pipe 52 is provided with a pressure regulating valve V2 for adjusting the pressure of the steam exhausted from the solar heat steam turbine 32b. Further, when steam extracted from the solar heat steam turbine 32b is delivered to the intermediate-pressure turbine 23 as cooling steam, the pipe 53 is provided with a flow regulating valve V3 for adjusting the flow rate of extracted steam from the solar heat steam turbine 32b. Moreover, when the steam extracted from the superhigh-pressure turbine 36 is delivered to the high-pressure turbine 22 as cooling steam, the pipe 54 is provided with a flow regulating valve V4 for adjusting the flow rate of extracted steam from the superhigh-pressure turbine 36.

In addition, with respect to the output of generated power in the steam turbine power plant 10, the flow rate of main steam delivered to the superhigh-pressure turbine 36 is adjusted with a steam control valve (not illustrated) so that the total output of the generator 35a and the generator 35b corresponds to a target output. Further, the above-described valves, pumps, and so on are feedback controlled by a not-illustrated control device based on information from, for example, a temperature sensing device, a flow sensing device, a pressure sensing device, and so on, which are not illustrated.

Steam delivered to the carbon dioxide collecting facility 60 by thus heating the steam exhausted from the solar heat steam turbine 32a by the heat collecting steam generator 37 has a state that does not belong to the moist region, and is delivered to the carbon dioxide collecting facility 60 at an appropriate temperature (150° C. for example).

Note that the structure and the operation and effect of the carbon dioxide collecting facility 60 are the same as those of the carbon dioxide collecting facility 60 in the steam turbine power plant 10 of the first embodiment.

Next, a cycle efficiency in the steam turbine power plant 12 of the third embodiment will be described with reference to FIG. 8. Note that descriptions overlapping with the description of the cycle efficiency in the steam turbine power plant 11 of the second embodiment are omitted here.

Since the temperature of steam delivered to the superhigh-pressure turbine 36 is about 600° C., the temperature of steam (temperature at 2) delivered to the solar heat steam turbine 32a in the steam turbine power plant 12 of the third embodiment is lower than the temperature of the steam (temperature at 2a in FIG. 6) delivered to the solar heat steam turbine 32 of the steam turbine power plant 11 of the second embodiment. When it is attempted to change the state of the steam exhausted from the solar heat steam turbine 32a in the steam turbine power plant 12 of the third embodiment to be at a temperature required in the carbon dioxide collecting facility 60 (for example, 150° C.), it is assumed that the state of steam belongs to a moist region (region lower than a saturated steam line illustrated in FIG. 8).

Accordingly, in the steam turbine power plant 12 of the third embodiment, the steam exhausted from the solar heat steam turbine 32a (steam state 9a) is heated in the heat collecting steam generator 37 and then delivered to the solar heat steam turbine 32b (steam state 9b). The state of the steam exhausted from the solar heat steam turbine 32b (steam state 9c) is made to be a steam state required in the carbon dioxide collecting facility 60.

Here, in the steam turbine power plant 12 of the third embodiment, the temperature of the steam delivered to the superhigh-pressure turbine 36 is equal to the temperature of steam delivered to the superhigh-pressure turbine in the conventional steam turbine power plant, and thus adiabatic expansion in the superhigh-pressure turbine 36 is 1->2. Adiabatic expansion in the solar heat steam turbine 32a is 2->9a. Adiabatic expansion in the solar heat steam turbine 32b is 9b->9c.

In FIG. 8, the area surrounded by steam state values higher than conventional steam state values (area of the portion denoted by oblique lines in FIG. 8) is an energy increment that can be taken out as work, that is, an amount of contribution to efficiency improvement owing to the temperature increase.

Thus, by driving the solar heat steam turbine 32a and the solar heat steam turbine 32b, it is possible to make the state of the steam exhausted from the solar heat steam turbine 32b be a steam state on a high-temperature side with respect to the saturated steam line (upstream of the saturated steam line illustrated in FIG. 8), and be a steam state required in the carbon dioxide collecting facility 60 (for example, 150° C.).

As described above, in the steam turbine power plant 12 of the third embodiment, in addition to the operation and effect of the steam turbine power plant 11 of the second embodiment, even when the temperature of the steam delivered to the superhigh-pressure turbine 36 is about 600° C., it is possible to make the state of the steam exhausted from the solar heat steam turbine 32b be a steam state which is on a high-temperature side with respect to the saturated steam line (upstream of the saturated steam line in FIG. 8) and is required in the carbon dioxide collecting facility 60 (for example, 150° C.)

The steam exhausted from the solar heat steam turbine 32b can thus keep the state of superheated steam. Therefore, a steam turbine power plant with high reliability can be obtained without causing a problem of erosion of rotor blades and stator blades of the final turbine stage.

The steam turbine power plant and the operating method thereof according to the embodiments enable to use exhaust steam with low exergy after power generation is performed with steam turbines utilizing solar heat as an energy source needed in a carbon dioxide collecting system, so as to suppress losses of energy and achieve high power generating efficiency. In the foregoing, the embodiments have been described specifically. However, the present invention is not limited to these embodiments, and can be changed in various ways within the range not departing from the spirit of the invention.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A steam turbine power plant, comprising:
   a steam turbine facility which comprises
      a boiler having a super heater and at least one reheater,
      a first steam turbine driven by main steam delivered from the super heater,
      a second steam turbine driven by steam delivered from the reheater, the reheater reheating steam exhausted from the first steam turbine,
      a third steam turbine driven by steam which is exhausted from the second steam turbine,
      a generator coupled with at least the third steam turbine,
      a steam condenser condensing steam exhausted from the third steam turbine into condensate,
      a feed water heater provided in a water supply system between the steam condenser and the boiler to heat feed water delivered from the steam condenser,
      a heat collecting steam generator generating steam from part of the condensate by utilizing heat of sunlight, and
      a fourth steam turbine driven by at least steam delivered from the heat collecting steam generator; and
   a carbon dioxide collecting facility which comprises
      an absorbing tower having an absorbing liquid configured to absorb carbon dioxide contained in combustion gas from the boiler,
      a recovery tower configured to heat the absorbing liquid by utilizing heat of steam exhausted from the fourth steam turbine so as to discharge the carbon dioxide from the absorbing liquid, and
      a collecting apparatus collecting carbon dioxide discharged in the recovery tower.

2. The steam turbine power plant according to claim 1, wherein the fourth steam turbine is further driven by steam exhausted from the first steam turbine.

3. The steam turbine power plant according to claim 1, wherein the steam turbine facility comprises a heat accumulator accumulating part of heat obtained in the heat collecting steam generator; and
wherein the heat accumulated in the heat accumulator is used to generate steam to be delivered to the fourth steam turbine.

4. The steam turbine power plant according to claim 1, wherein the reheater comprises a first reheater and a second reheater,
wherein the second steam turbine comprises two steam turbines, one of the two steam turbines is driven by steam reheated in the first reheater, the other of the two steam turbines is driven by steam reheated in the second reheater,
wherein steam exhausted from the one of two steam turbines is delivered to the second reheater, and steam exhausted from the other of the two steam turbines is delivered to the third steam turbine.

5. The steam turbine power plant according to claim 1, further comprising,
a pressure regulating valve adjusting a pressure of steam exhausted from the fourth steam turbine.

6. The steam turbine power plant according to claim 1, wherein steam extracted from the fourth steam turbine is delivered to the second steam turbine as cooling steam of the second steam turbine.

7. The steam turbine power plant according to claim 1, further comprising,
a flow regulating valve adjusting a flow rate of steam exhausted from the fourth steam turbine, the flow regulating valve being regulated based on a temperature of the absorbing liquid in the recovery tower.

8. The steam turbine power plant according to claim 1, further comprising,
a flow regulating valve adjusting a flow rate of steam exhausted from the fourth steam turbine, the flow regulating valve being regulated based on a flow rate of the absorbing liquid in the recovery tower.

9. The steam turbine power plant according to claim 1, wherein the fourth steam turbine is coupled with the third steam turbine.

10. An operating method of a steam turbine power plant, comprising:
generating main steam in a boiler;
driving a first steam turbine by the main steam;
supplying at least part of exhaust steam from the first steam turbine to the bolier to generate reheated steam;
generating the reheated steam in the boiler;
driving a second steam turbine by the reheated steam;
driving a third steam turbine steam exhausted from the second steam turbine;
condensing steam exhausted from the third steam turbine into condensate;
heating the condensate by utilizing heat of steam extracted or exhausted from at least one of the first, the second, and the third steam turbines;
supplying at least part of the condensate to the boiler to generate the main steam;
generating steam from part of the condensate in a heat collecting steam generator by utilizing heat of sunlight;
driving a fourth steam turbine by steam generated in at least the heat collecting steam generator;
absorbing carbon dioxide contained in combustion gas from the boiler into an absorbing liquid;
heating the absorbing liquid by utilizing heat of steam exhausted from the fourth steam turbine at a recovery tower so as to discharge the carbon dioxide; and
collecting carbon dioxide discharged from the recovery tower.

\* \* \* \* \*